United States Patent [19]

Akimoto et al.

[11] Patent Number: 5,144,447
[45] Date of Patent: Sep. 1, 1992

[54] SOLID-STATE IMAGE ARRAY WITH SIMULTANEOUSLY ACTIVATED LINE DRIVERS

[75] Inventors: Hajime Akimoto, Hachioji; Shinya Ohba, Kanagawa; Mitsuyuki Mitsui, Kokubunji, all of Japan

[73] Assignee: Hitachi, Ltd., Tokyo, Japan

[21] Appl. No.: 330,314

[22] Filed: Mar. 29, 1989

[30] Foreign Application Priority Data

Mar. 31, 1988 [JP] Japan .................................. 63-76174
Apr. 13, 1988 [JP] Japan .................................. 63-89053
May 20, 1988 [JP] Japan .................................. 63-121724

[51] Int. Cl.⁵ .................................................. H04N 3/14
[52] U.S. Cl. ........................ 358/213.11; 358/213.19; 358/213.29; 358/213.26
[58] Field of Search ................ 358/213.19, 213.26, 358/213.29, 213.22, 213.24, 213.31, 482, 483, 213.11; 250/552, 553

[56] References Cited

U.S. PATENT DOCUMENTS

| 4,573,076 | 2/1986 | Tisue et al. | 358/231.31 |
| 4,835,617 | 5/1989 | Todaka et al. | 358/213.19 |
| 4,868,646 | 9/1989 | Tsuji | 358/213.19 |
| 5,027,217 | 6/1991 | Oshio et al. | 358/213.19 |

Primary Examiner—Edward L. Coles, Sr.
Assistant Examiner—Jill Jackson
Attorney, Agent, or Firm—Antonelli, Terry, Stout & Kraus

[57] ABSTRACT

The present invention relates to an improved solid-state imaging device having pixel amplifiers. The higher definition of the device results in the increase in number of pixels as large as not less than two million. When a solid-state imaging device having such a large number of pixels is provided with pixel amplifiers, there arise various problems associated with a power source and a power supply line as well as a problem inherent to the pixel amplifier type of solid-state imaging device. The present invention provides a solid-state imaging device in which noises or the like are prevented and a picture or image quality having high definition can be obtained, by suppressing a voltage drop of the power supply line and by compensating fluctuations in outputs of the pixel amplifiers.

16 Claims, 26 Drawing Sheets

FIG. I
PRIOR ART $R_1C_1 \leq R_2C$ $R_4C_4 \leq R_3C$

SOLID-STATE IMAGE ARRAY WITH SIMULTANEOUSLY ACTIVATED LINE DRIVERS

BACKGROUND OF THE INVENTION

The present invention relates to a solid-state imaging (or pickup) device which can provide an output picture or image having an excellent uniformity. The present invention also relates to a solid-state imaging device which contains a multiplicity of pixels and has an amplifying means in each pixel or plural pixels (hereinafter referred to as pixel amplifier). The present invention further relates to a solid-state imaging device in which high-speed signal read-out can be successfully made.

Solid-state imaging devices on the market include an MOS solid-state imaging device and a CCD imaging device. On the other hand, in order to improve the sensitivity and the dynamic range, a solid-state imaging device having an amplifying means in each pixel is now under study and development (see Ando et al, "TRIAL MANUFACTURE OF AMPLIFYING TYPE OF MOS AREA SENSOR (GCMA)", Proceedings of the Institute of Electronics and communication Engineers of Japan, 1241, 1983). The solid-state imaging device having an amplifying means in each pixel is characterized in that each of photoelectric conversion elements or photodiodes on a face plate is provided with an amplifying means adjacent thereto for amplifying electric (or signal) charges produced in the photoelectric conversion element.

The above-mentioned conventional solid-state imaging device having an amplifying means in each pixel will now be explained by virtue of FIG. 1 which shows the construction thereof.

In FIG. 1, reference numeral 1 designates photoelectric conversion elements or photodiodes, numeral 2 amplifier transistors in pixels, numeral 3 selective transistors, numeral 4 reset transistors, numeral 5 power supply lines, numeral 6 vertical scanning lines, numeral 7 vertical signal lines, numeral 8 horizontal switching transistors, numeral 9 an output line, symbol YDC a Y driver circuit or vertical shift register, and symbol XDC an X driver circuit or horizontal shift register. The photoelectric conversion element 1 is connected to the gate of the pixel amplifier transistor 2 which has a signal amplifying function. The source of the pixel amplifier transistor 2 is connected to the vertical signal line 7 and the drain thereof is connected to the source of the selective transistor 3 which operates to select the pixel amplifier transistor 2. One pixel is formed by the photoelectric conversion element 1, the pixel amplifier transistor 2, the selective transistor 3 and the reset transistor 4. The photoelectric conversion elements 1, the pixel amplifier transistors 2 and the power supply lines 5 are formed on a face plate. The area sensor reported by the above-mentioned Ando et al's article includes 136 (horizontal) × 102 (vertical) elements.

The gate of the selective transistor 3 is scanned by the vertical scanning line 6 and the drain thereof is supplied with a current from the power supply line 5.

The gate of the reset transistor 4 which resets the photoelectric conversion element 1 is scanned by the vertical scanning line 6 adjacent to the vertical scanning line 6 which scans the gate of the selective transistor 3 in the pixel containing that reset transistor 4. The source and drain of the reset transistor 4 are connected to the photoelectric conversion element 1 and the power supply line 5, respectively.

Each pixel has a signal amplifying means or circuit which is formed by the pixel amplifier transistor 2, the selective transistor 3 and the reset transistor 4. These transistors are driven by the Y driver circuit YDC through the power supply line 5 and the vertical scanning line 6.

The vertical signal line 7 which transfers an amplified signal current is connected to the output line 9 through the horizontal switching transistor 8 scanned by the X driver circuit XDC. The X driver circuit XDC and the horizontal switching transistor 8 forms a transfer or read-out means for the amplified signal.

In operation, electric (or signal) charges produced by photoelectric conversion of light (or optical signal) incident upon the photoelectric conversion element 1 changes the gate voltage of the pixel amplifier transistor 2. Now provided that the power supply line 5 and the vertical scanning line 6 in the n-th row in a vertical direction are selected by the Y driver circuit YDC in a horizontal blanking period, the potentials of those selected lines take high levels so that the selective transistors 3 in the n-th row are turned on and hence the drains of the pixel amplifier transistors 2 in the n-th row take high levels. Next, if the horizontal switching transistor 8 in the m-th column is turned on through the scan thereof by the X driver circuit XDC in a horizontal scanning period, the vertical signal line 7 in the m-th column in a horizontal direction is coupled to the output line 9 through the horizontal switching transistor 8. Thus, since the drain of the pixel amplifier transistor 2 in the n-th row in the vertical direction and in the m-th column in the horizontal direction takes its high level and the source thereof is coupled to the output line 9, an output current corresponding to the gate voltage of the pixel amplifier transistor 2 is supplied to the output line 9.

Amplified signal outputs can be obtained by successively operating the pixel amplifier transistors 2 in the horizontal and vertical directions as has been explained in the above. The resetting of the photoelectric conversion elements 1 in the n-th row in the vertical direction is made in such a manner that the vertical scanning line 6 in the (n+1)th row in the vertical direction is turned to a high level in the next horizontal blanking period, thereby turning off the reset transistors 4 in the n-th row in the vertical direction.

SUMMARY OF THE INVENTION

The present invention is directed to the solution of problems in a high-definition (or high picture or image quality) solid-state imaging device. The high-definition solid-state imaging device has pixels the number of which is not less than about two million (1000×2000). Therefore, the high-definition solid-state imaging device involves an inherent problem in quality different from a solid-state imaging device having pixels the number of which is in order of two-hundred and fifteen thousand to four-hundred thousand (500×500 to 500×800). For example, in the above-mentioned prior art, no consideration is paid to a voltage drop caused from a line resistance of the power supply line 5, and hence an approach in the fabrication process of making a high definition (or large scale integration) device in order to improve the performance of the device provides a problem that amplifying actions of the pixel amplifier transistors 2 in an end portion of the face plate (or far from the Y driver circuit YDC) are affected to make it difficult to obtain a uniform output picture or image.

More especially, a current $I_{DS}$ flowing through each of the pixel amplifier transistors 2 is determined by $$I_{DS} = \frac{1}{2} \cdot \frac{W}{L} \cdot \mu \frac{\epsilon_{OX}}{t_{OX}} (V_G - V_{th})^2, \quad (1)$$

where W is the gate width of the pixel amplifier transistor, L the gate length of the pixel amplifier transistor, $\mu$ the electron mobility in silicon, $\epsilon_{OX}$ the permittivity or dielectric constant of $SiO_2$, $t_{OX}$ the thickness of gate oxide, $V_G$ the gate voltage, and $V_{th}$ the threshold voltage. Paying attention to the pixel amplifier transistor 2 in the end portion of the face plate farthest from the Y driver circuit YDC, a voltage drop V of the power supply line 5 is given by $$V = I_{DS} \cdot \rho_{Al} \frac{l}{w} \quad (2)$$

where $\rho_{Al}$ is the sheet resistance of Al line, w the width of Al line, and l the length of Al line.

Now assume the following values as one example: W=5 μm, L=1 μm, μ=700 cm²/V·S, $\epsilon_{OX}=3.45\times10^{-13}$ F/cm, $t_{OX}=200$ Å, $V_G=5$ V, $V_{th}=1$ V, $\rho_{Al}=50$ mΩ/□, and l=8.8 mm (⅔ inch optical format). In this case, the voltage drop V is determined from the equations (1) and (2) as follows:

$$V = \frac{2.13}{w} (V). \quad (3)$$

Namely, the quantity of the voltage drop is inversely proportional to the Al line width w. For example, the voltage drop is 1.07 V in the case of w=2 μm and 2.13 V in the case of w=1 μm. Thus, as the Al line width w becomes smaller with the advance of high definition of the device, the voltage drop of the power supply line 5 at the pixel amplifier transistor 2 in the end portion of the face plate farthest from the Y driver circuit YDC is remarkably increased to give a hindrance to the amplifying action of the pixel amplifier transistor 2. The approach of making high definition of the device results in the more and more increased of a voltage drop caused from the line resistance with the increase in number of pixels.

The present invention directed to a solid-state imaging device comprising a plurality of photoelectric conversion elements, signal amplifying means in number equal to or different from the photoconversion elements for receiving and amplifying electric signals produced by optical signals incident upon the respective photoelectric conversion elements, power supply lines for supplying electric power to the signal amplifying means, power supply line driving means for driving the power supply lines, and transfer means for reading out the outputs of the signal amplifying means is characterized in that at least two power supply line driving means driven with the substantially the same clock (or at substantially the same timing) are provided and at least one signal amplifying means is connected to the power supply line connected between the power supply line driving means.

In the present invention, since the plurality of power supply line driving means driven with substantially the same clock are provided, and since the at least one signal amplifying means is connected to the power supply line connected between the power supply line driving means, a voltage drop V of the power supply line at the signal amplifying means in a central portion of a face plate farthest from the power supply line driving means in the case where two power supply line driving means to drive the power supply line from opposite ends thereof are provided, is determined by $$V = \frac{1}{2} I \cdot \rho_{Al} \cdot \frac{l}{2w} \quad (4)$$

where I is an input current of the signal amplifying means. From the comparison of the equation (4) with the equation (2), it can be understood that the voltage drop of the power supply line in the present invention is suppressed to one fourth of that in the conventional device.

An object of the present invention is to provide a solid-state imaging device which is suitable for high definition or high picture (or image) quality.

Another object of the present invention is to reduce noises of a solid-state imaging device which has a multiplicity of pixels (in number not less than about two million).

A further object of the present invention is to provide a solid-state imaging device which has a multiplicity of pixels and in which an output signal is not substantially deteriorated even if the output frequency is increased.

These and other objects and many of the attendant advantages of the present invention will be readily appreciated as the same becomes better understood by reference to the following detailed description when considered in connection with the accompanying drawings.

DESCRIPTION OF THE PREFERRED EMBODIMENTS

Embodiments of the present invention will now be explained by virtue of the accompanying drawings. First to fifth embodiments concern a power supply line driving circuit. Sixth to eighth embodiments concern a power supply line. Ninth to sixteenth embodiments concern the improvements of a switching transister, the combination of these embodiments and the applications to a system.

EMBODIMENT 1

Figure 1:
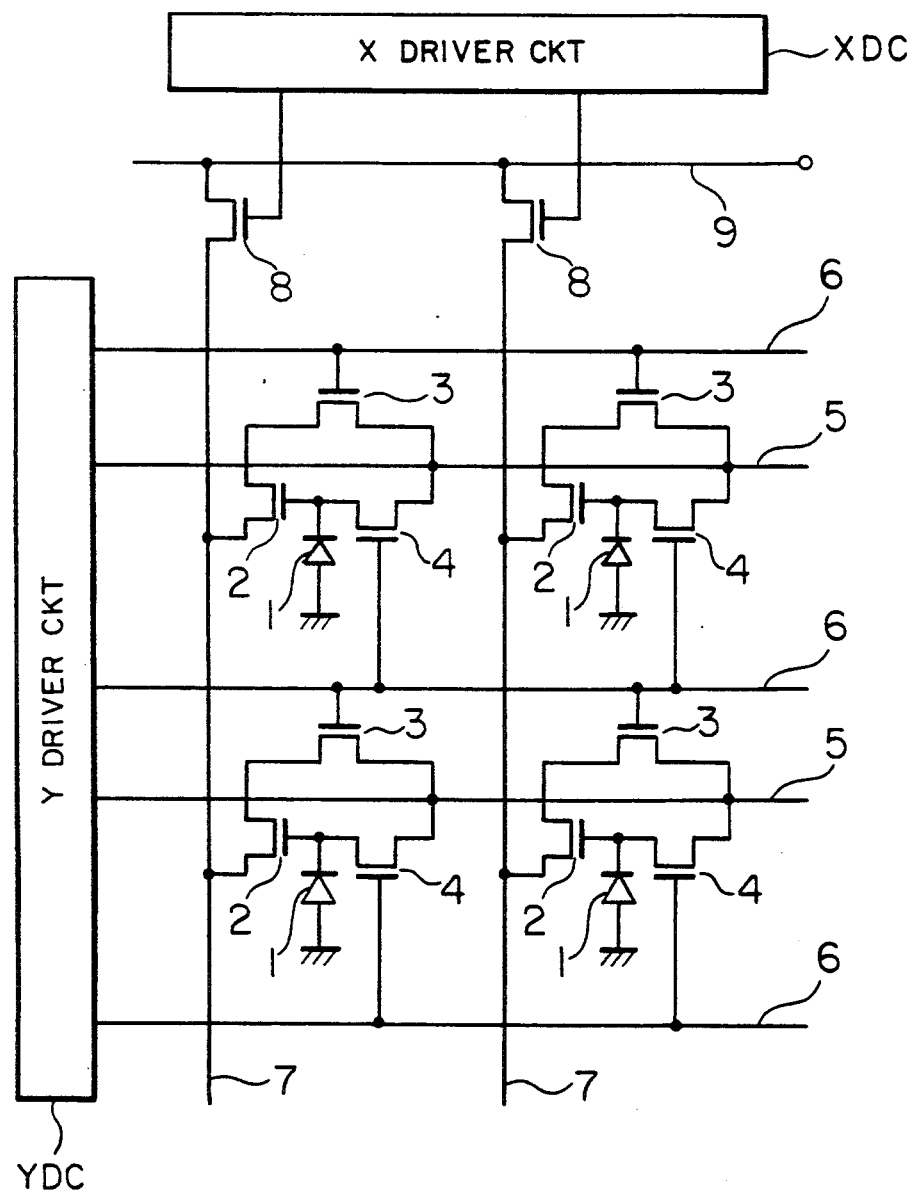
FIG. 1 is a circuit diagram for explaining the conventional solid-state imaging device.
Figure 2:
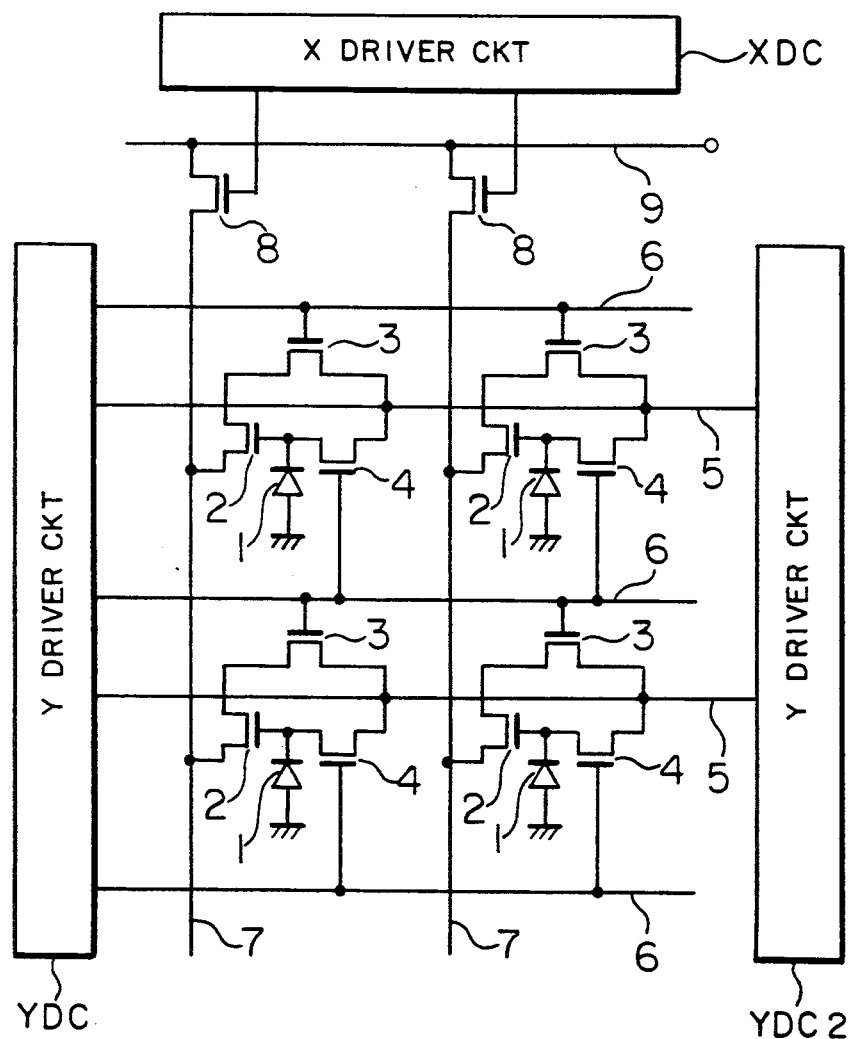
FIGS. 2 to 6 are views for explaining first to fifth embodiments of the present invention.

FIG. 2 is a circuit diagram showing the construction of a first embodiment of the present invention. Components indicated in FIG. 2 by the same reference numerals or symbols as the components in FIG. 1 are the same as or equivalent to those in FIG. 1.

In FIG. 2, reference symbol YDC2 designates a Y driver circuit or vertical shift register which is a power supply line driving means. Namely, the present embodiment is characterized in that Y driver circuits or vertical shift registers YDC and YDC2 are respectively connected to opposite ends of each of power supply lines 5. The other structure is similar to the structure of the conventional device shown in FIG. 1. The operation of the present embodiment is similar to that of the conventional device explained in conjunction with FIG. 1 except that the power supply line 5 is driven by the Y driver circuits YDC and YDC2 on the left and right sides with substantially the same clock.

The operation of the present embodiment will now be explained. Electric (signal) charges produced by photoelectric conversion of light (or an optical signal) incident upon a photoelectric conversion element or photodiode 1 changes the gate voltage of a pixel amplifier transistor 2. Provided that each of a power supply line 5 and a vertical scanning line 6 in the n-th row in a vertical direction is selected by the Y driver circuit YDC and the Y driver circuit YDC2 simultaneously with each other in a horizontal blanking period, the potentials of those selected lines take high levels so that selective transistors 3 in the n-th row are turned on and the drains of the pixel amplifier transistors 2 in the n-th row take high levels. Next, when a horizontal switching transistor 8 in the m-th column is turned on through the scan thereof by an X driver circuit or horizontal shift register XDC in a horizontal scanning period, a vertical signal line 7 in the m-th column in a horizontal direction is coupled to an output line 9 through the horizontal switching transistor 8. Thus, since the drain of the pixel amplifier transistor 2 in the n-th row in the vertical direction and the m-th column in the horizontal direction takes its high level and the source thereof is coupled to the output line 9, an output current corresponding to the gate voltage of the pixel amplifier transistor 2 is supplied to the output line 9. Amplified signal outputs can be obtained by successively operating the pixel amplifier transistors 2 in the horizontal and vertical directions in the above-mentioned manner The resetting of the photoelectric conversion elements 1 in the n-th row in the vertical direction is made in such a manner that a vertical scanning line 6 in the (n+1)th row in the vertical direction is turned to its high level in the next horizontal blanking period so that a reset transistor 4 in the n-th row in the vertical direction is turned off.

According to the present embodiment, the simultaneous driving of the power supply line 5 by the Y driver circuits YDC and YDC2 on opposite sides of the power supply line 5 can suppress any non-uniformity in an output picture or image signal which may otherwise occur due to a voltage drop of the power supply line 5.

EMBODIMENT 2

Figure 3:
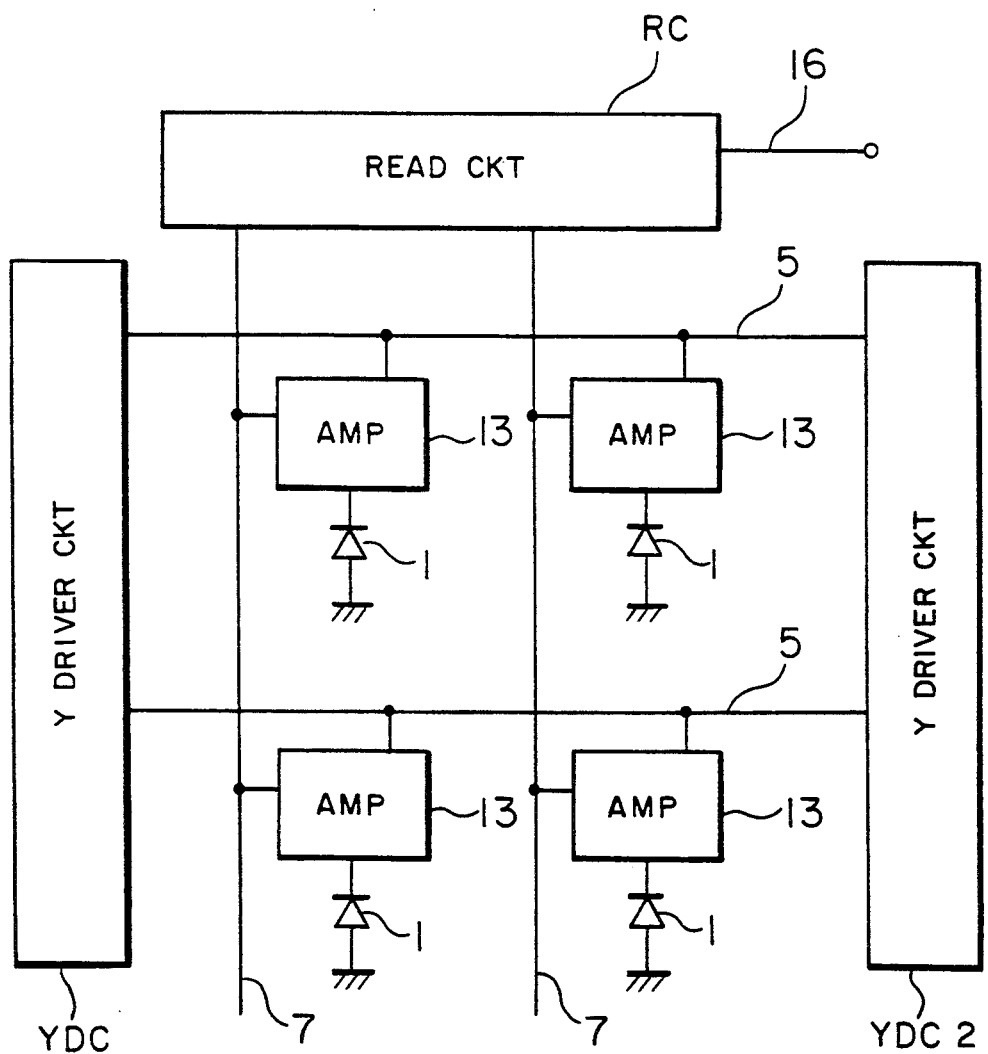

FIG. 3 is a circuit diagram showing the construction of a second embodiment of the present invention. A photoelectric conversion element or photodiode 1 and a signal amplifying circuit 13 connected to the photoelectric conversion element 1 constitutes one pixel. To the signal amplifying circuit 13 are connected a power supply line 5 which has at opposite ends thereof Y driver circuits or vertical shift registers YDC and YDC2 and a vertical signal line 7 which has at one end thereof a read circuit RC as a transfer means for the amplified signal. An output line 16 extends from the amplified signal read circuit RC.

In operation, electric (or signal) charges produced by photoelectric conversion of light incident upon the photoelectric conversion element 1 are inputted to the signal amplifying circuit 13. Now provided that the power supply line 5 in the n-th row in a vertical direction is selected by the Y driver circuits YDC and YDC2 on left and right sides of the power supply line 5 in a horizontal blanking period so that the potential of the power supply line 5 in the n-th row takes a high level, the signal amplifying circuits 13 in the n-th row are activated. Amplified outputs are delivered to the vertical signal lines 7 at this point of time, or the vertical signal lines 7 are successively selected by the amplified signal read circuit RC so that amplified outputs of the signal amplifying circuit 13 in the n-th row are successively delivered onto the output line 16. The resetting of the photoelectric conversion elements 1 is made at a proper timing through the power supply line 5 from both or one of the Y driver circuits YDC and YDC2.

EMBODIMENT 3

Figure 4:
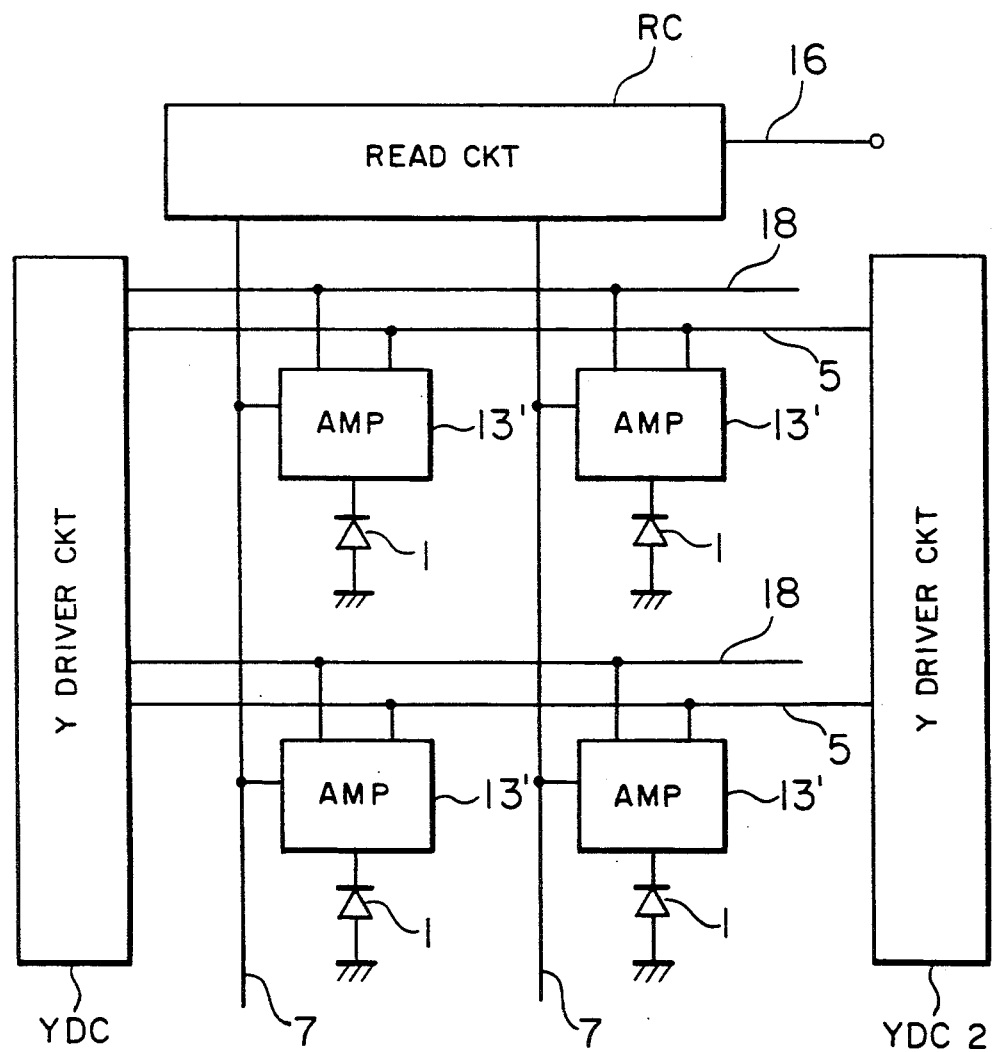

FIG. 4 is a circuit diagram showing the construction of a third embodiment of the present invention. The circuit construction of the present embodiment is similar to that of the embodiment of FIG. 3 except that a vertical scanning line 18 extends from a Y driver circuit YDC to a signal amplifying circuit 13'.

The operation of the present embodiment is similar to that of the embodiment of FIG. 3 except that the vertical scanning lines 18 scanned by the Y driver circuit YDC are used for the selection of the signal amplifying circuits 13' in the vertical direction, or a resetting operation and so on.

EMBODIMENT 4

Figure 5:
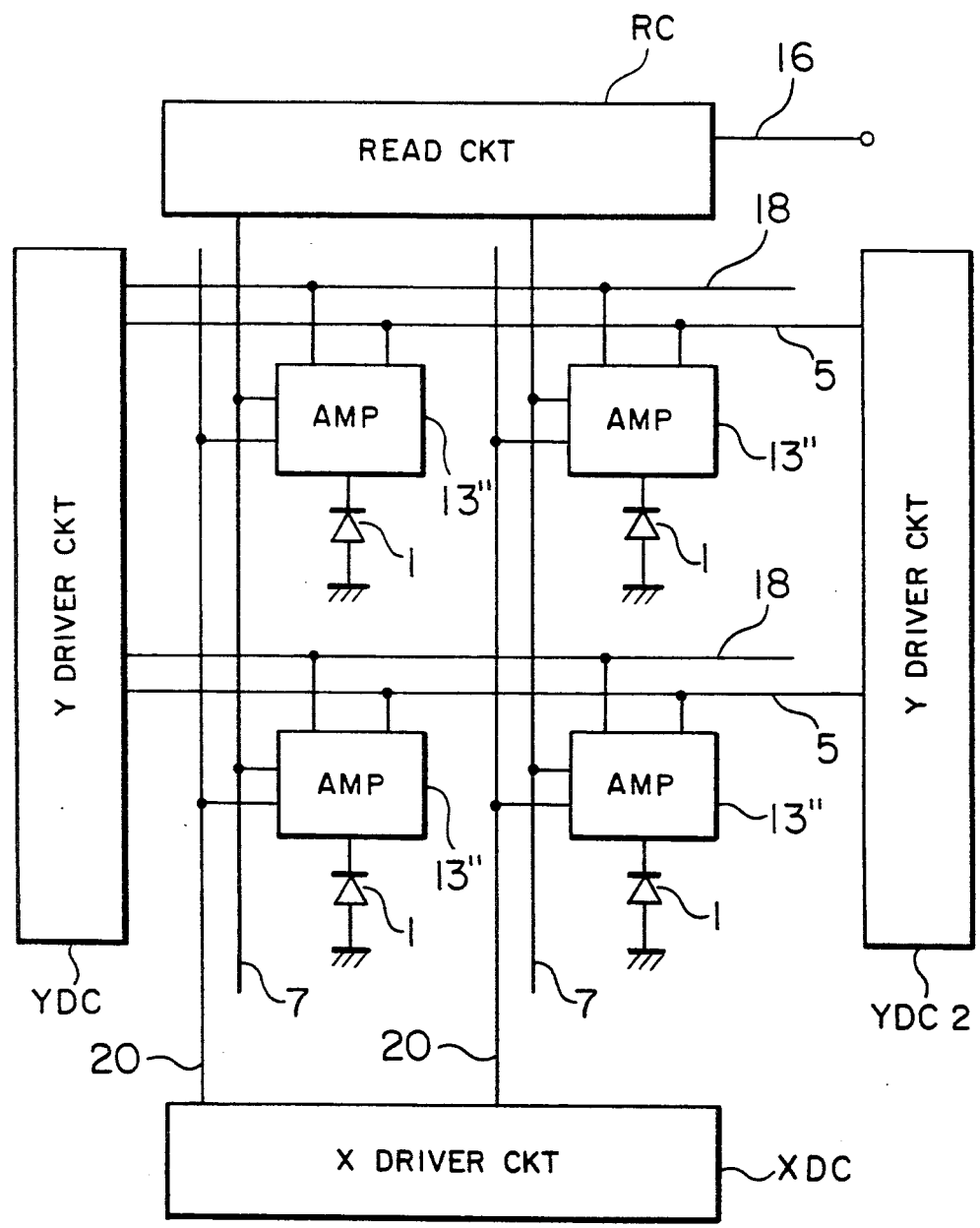

FIG. 5 is a circuit diagram showing the construction of a fourth embodiment of the present invention. The circuit construction of the present embodiment is similar to that of the embodiment of FIG. 4 except that an X driver circuit or horizontal shift register XDC and horizontal scanning lines 20 extending from the X driver circuit XDC to signal amplifying circuits 13" are provided.

The operation of the present invention is similar to that of the embodiment of FIG. 4 except that the horizontal scanning lines 20 scanned by the X driver circuit XDC are used for the selection of the signal amplifying circuits 13" in a horizontal direction, or a resetting operation and so on.

EMBODIMENT 5

Figure 6:
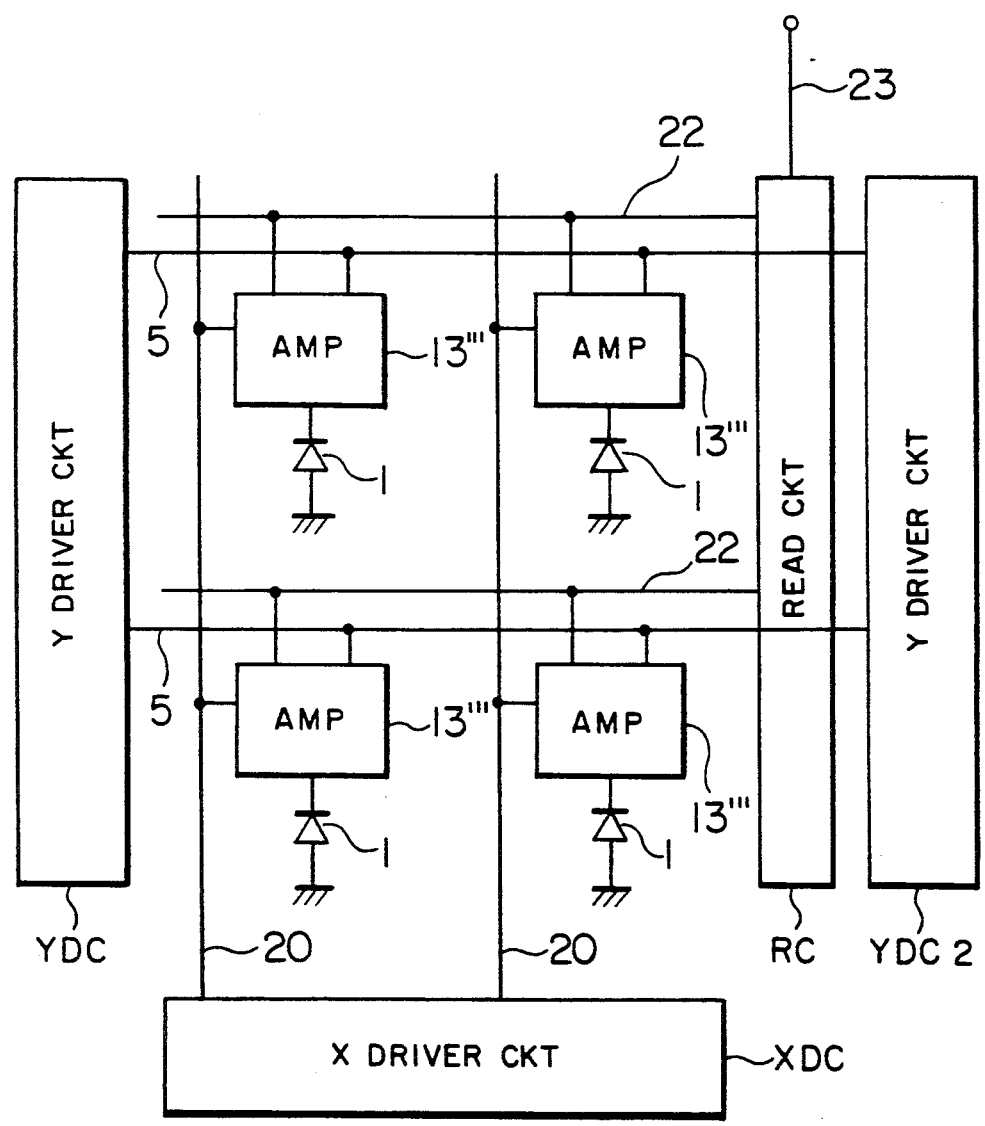

FIG. 6 is a circuit diagram showing the construction of a fifth embodiment of the present invention. In the present embodiment, a photoelectric conversion element or photodiode 1 and a signal amplifying circuit 13''' form one pixel. To the signal amplifying circuit 13''' are also connected a power supply line 5 which has at opposite ends thereof Y driver circuits or vertical shift registers YDC and YDC2, a horizontal signal line 22 which has at one end thereof an amplified signal read circuit RC as a transfer means for the amplified signal and a horizontal scanning line 20 which has at one end thereof an X driver circuit or horizontal shift register XDC. An output line 23 extends from the amplified signal read circuit RC.

In operation, electric (or signal) charges produced by photoelectric conversion of light incident upon the photoelectric conversion element 1 are inputted to the signal amplifying circuit 13'''. Now provided that the power supply line 5 in the n-th row in a vertical direction is selected by the Y driver circuits YDC and YDC2 on left and right sides of the power supply line 5 in a horizontal blanking period, so that the potential of the power supply line 5 in the n-th row takes a high level, the signal amplifying circuits 13" are activated. Subsequently, in a horizontal scanning period, the horizontal scanning lines 20 are successively selected by the X driver circuit XDC. Thus, the signal amplifying circuit 13''' selected by both the power source line 5 and the horizontal scanning line 20 is activated so as to output an amplified signal to the horizontal signal line 22. The amplified signal outputted to the horizontal signal line 22 is delivered to the output line 23 through the amplified signal read circuit RC. The resetting of the photoelectric elements 1 are made at a proper timing through the power supply lines 5 from both or one of the Y driver circuits YDC and YDC2 or through the horizontal scanning lines 20 from the X driver circuit XDC.

In the foregoing embodiments, explanation has been made in conjunction with the case where the number of photoelectric conversion elements is 2×2. However, it is obvious that the number of photoelectric elements may be (arbitrary integer x)×(arbitrary integer y). Also, it is apparent that the impurity conductivity (p and n) types of semiconductors may be reversed while the positive and negative signs of voltages are reversed. Further, it can be readily understood from each of the above-disclosed embodiments that instead of providing one signal amplifying means or circuit (of pixel amplifier) for each photoelectric conversion element, one signal amplifying circuit may be provided for a plurality of (for example, 2 to 4) photoelectric conversion elements. Though in each of the shown embodiments the power supply lines are provided parallel to a horizontal scanning direction, it can be readily understood that the power supply lines may be provided perpendicularly to the horizontal scanning direction. Though in each of the disclosed embodiments there are provided two power supply line driving means (or Y driver circuits) which drive the power supply line from opposite ends thereof, the targeted object of the present invention can be achieved so long as a plurality of power supply line driving means driven with substantially the same clock are provided and at least one signal amplifying means is connected to the power supply line connected between those power supply line driving means.

As has been explained in the above, in the disclosed embodiments, since a plurality of power supply line driving means driven with substantially the same clock are provided and at least one signal amplifying means is connected to the power supply line connected between the plurality of power supply line driving means, a voltage drop of the power supply line can be suppressed to one fourth of that in the conventional device. Therefore, there is provided an effect that any hindrance to the amplifying actions of signal amplifying means in an end portion of a face plate can be suppressed, thereby improving the uniformity of an output picture or image. This effect is significant since in recent years, a voltage drop caused from a line resistance has a tendency to increase more and more with the increase in the number of pixels which results from the development of a high definition device.

EMBODIMENT 6

The increase in number of pixels and their improvement of S/N ratio are indispensable for the acquisition of a picture or image having a high quality. In the case where the number of pixels is increased, it is foreseeable that the sensitivity may be lowered with the reduction of pixel dimensions and noises may be introduced since a high-speed driving is required.

Figure 7:
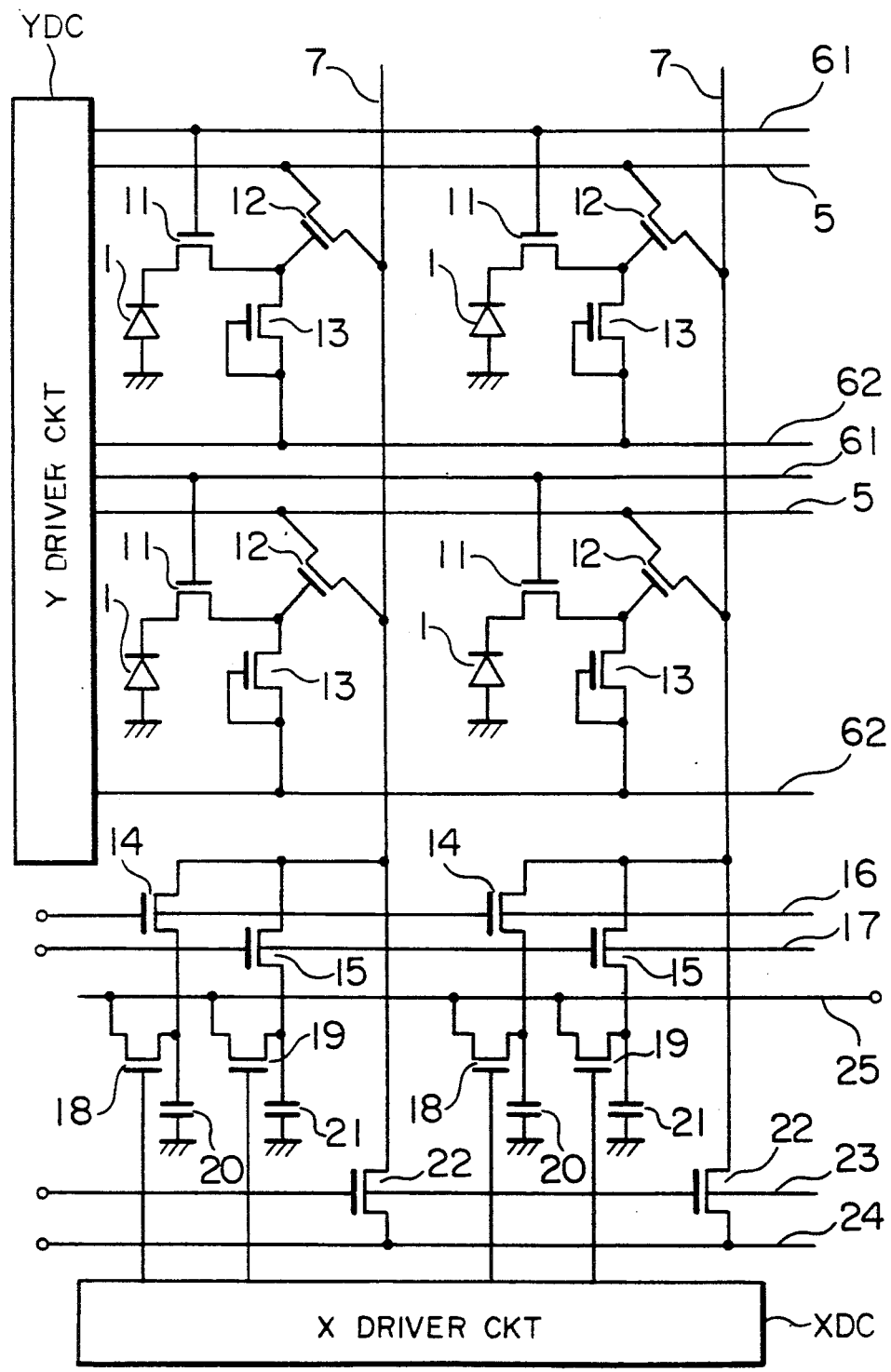
FIGS. 7 to 13 including 10A, 10B are views for explaining sixth to eighth embodiments of the present invention.

FIG. 7 shows an example of a solid-state imaging device which has already been proposed by the present inventors. Each of two-dimensionally arranged photoelectric conversion elements or photodiodes 1 is connected, through a vertical gate switch 11 controlled by a vertical gate line 61, to the gate of a pixel amplifier 12 and to a reset switch 13 controlled by a reset line 62. The pixel amplifier 12 is an MOS transistor the drain and source of which are respectively connected to a drain line 5 and to the drain of a load transistor 22 through a vertical signal line 7 so that a source follower circuit is formed as a whole. The source of the load transistor 22 is connected to a load source line 24 and the gate thereof is connected to a load gate line 23. The source follower circuit is provided with storage capacitors 20 and 21 through gate switches 14 and 15 which are controlled by gate lines 16 and 17, respectively. The storage capacitors 20 and 21 are connected to a horizontal signal line 25 through horizontal gate switches 18 and 19. The scanning lines are scanned by a Y driver circuit or vertical scanning circuit (vertical register) YDC and an X driver circuit or horizontal scanning circuit (horizontal register) XDC.

The outputting of electric (or signal) charges produced by incident light and stored in the photoelectric conversion element 1 is carried out in the following procedure. When photoelectric conversion element 1 in one row along a horizontal direction to be next read is selected at the beginning of a horizontal blanking period for output of the device, a reset line 62 corresponding to the one row is turned on and off to perform a resetting operation by the reset switches 13. When the drain line 5 is thereafter turned on, each of pixel amplifiers 12 in that one row operates as a source follower driver transistor. The output of each source follower at this point of time is an output of the amplifier in the case where no electric (or signal) charges are present. This output voltage is stored into the storage capacitor 20 through the gate switch 14 by virtue of the ON/OFF state of the gate line 16. Next, when a vertical gate line 61 corresponding to the one row along the horizontal direction is turned on and off so that electric charges are added to the gate of each pixel amplifier 12, the output of each source follower has a value corresponding to the amount of electric charges. This output voltage is stored into the storage capacitor 21 through the gate switch 15 by turning on and off the gate line 17.

The foregoing pertains to an operation in the horizontal blanking period. In a horizontal scanning output period, the X driver circuit XDC scans the horizontal gate switches 18 and 19 corresponding to the respective pixels so as to successively open and close them so that the electric charges or source follower outputs having been stored in the storage capacitors 20 and 21 are successively outputted from the output line 25. The output charges having been stored in the storage capacitors 20 and 21 are obtained from the succession of the output of one pixel amplifier 12 upon reset and the output thereof upon input of electric charges with respect to time. By making a difference between both the outputs, noises caused from input offset fluctuations of a plurality of source followers as well as 1/f noises of the source follower can be easily suppressed.

In the example shown in FIG. 7, since the pixel amplifiers 12 are driven in such a manner that pixel amplifiers 12 in one row along the horizontal direction are simultaneously turned on, a very large current transiently flows in the drain line 5 to produce an operational voltage drop due to the resistance of the drain line 5 which is not neglect. Therefore, there is a problem that the outputs of the pixel amplifiers 12 in the case where they are simultaneously turned on have fluctuations so that noises called shading are generated. This problem becomes more remarkable with the increase in the number of pixels in the horizontal direction.

The object of a sixth embodiment of the present invention is to effectively suppress the generation of shading, thereby providing a solid-state imaging device which has a high sensitivity and low noises.

To achieve the above object, the sixth embodiment of the present invention provides a solid-state imaging device comprising a plurality of photoelectric conversion elements two-dimensionally arranged in a semiconductor substrate for storing electric (or signal) charges corresponding to light incident thereupon, pixel amplifiers provided adjacent to the photoelectric conversion elements for amplifying the electric charges stored in the photoelectric conversion elements, and means for resetting the inputs of the pixel amplifiers, the pixel amplifiers in a horizontal direction being simultaneously driven, characterized in that there are provided a drain line which commonly supplies currents for the pixel amplifiers in the horizontal direction and a vertical signal line which commonly outputs currents of the pixel amplifiers in a vertical direction, and that a resistance per unit length of the drain line is lower than that of the vertical signal line.

In the present embodiment, since the resistance per unit length of the drain line which controls the pixel amplifiers is made lower than the resistance per unit length of the vertical signal line, a voltage drop at the drain line can be reduced to a negligibly small value. Accordingly, outputs when pixel amplifiers in a horizontal direction are simultaneously turned on become uniform, thereby making it possible to suppress noises called shading.

The reason why the resistance per unit length of the drain line is made lower than the resistance per unit length of the vertical signal line will now be explained. Since the pixel amplifiers are driven in such a manner that the pixel amplifiers in a horizontal direction are simultaneously turned on, a current corresponding to the number of pixels in one row along the horizontal direction (equal to the number of vertical signal lines) flows in the drain line. This current flowing in the drain line corresponds to a current flowing in the vertical signal line multiplied by the number of pixels in one row along the horizontal direction and hence a voltage drop produced at the vertical signal line is negligibly small as compared with a voltage drop produced at the drain line. Therefore, it is not necessary to make the resistance of the vertical signal line small. In addition, if the resistance of the vertical signal line is made low, there arises a problem that when the cross-sectional area of a line is made large to reduce the resistance of the line in the case where alumimum usually used is employed as the line material, the capacitance of the vertical signal line becomes large so that the rise of the output of a pixel amplifier is deteriorated, thereby making it difficult to obtain a high-speed operation. As for the drain line, on the other hand, since it is driven by a sufficiently large amplifier of the shift register, a problem associated with the addition of any capacitance is very small.

In the case where a low resistance material other than alumimum hitherto successfully used is employed as the line material for both of the drain line and the vertical signal line, a two-layer process is required, thereby lowering the yield. Therefore, even if such a material is used, it should be used for only the drain line for the above reason.

Figure 8:
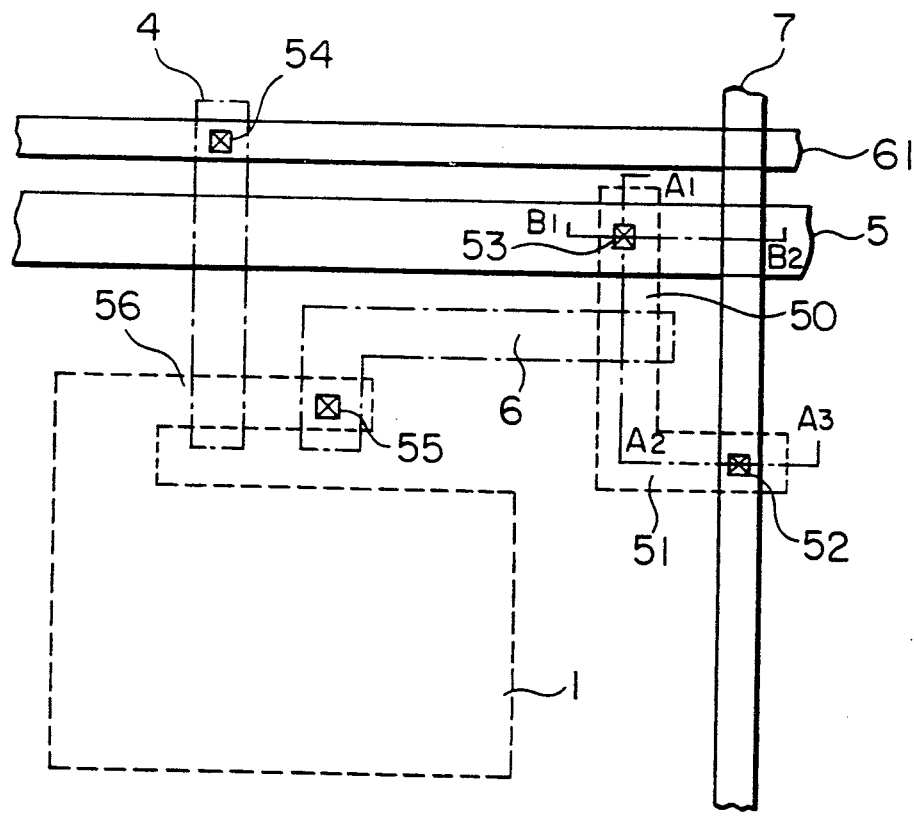
Figure 9:
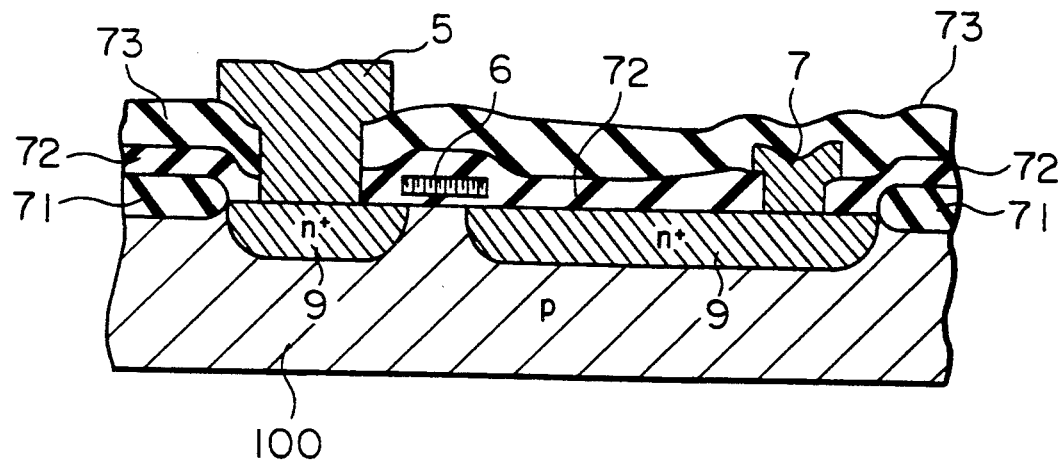

A circuit diagram of the sixth embodiment of the present invention is the same as the circuit diagram shown in FIG. 7. Accordingly, FIG. 7 should be also regarded as being the circuit diagram of the sixth embodiment. FIG. 8 is a view showing the layout of a part of one pixel in the present embodiment. A reset switch 13 is omitted from FIG. 8. A photoelectric conversion element 1 forms a vertical gate switch 11 together with a gate 4 and a drain 56. The gate 4 is connected to a vertical gate line 61 through a contact 54. A pixel amplifier 12 is constructed by a source 51, a gate 6 and a drain 50. The source 51 is connected to a vertical signal line 7 through a contact 52 and the drain 50 is connected to a drain line 5 through a contact 53. The gate 6 is connected to the drain 56 of the vertical gate switch 11 through a contact 55. FIG. 9 shows a part of the cross section taken along line $A_1$-$A_2$-$A_3$ in FIG. 8. The pixel amplifier 12 is formed by a gate electrode 6 and $n^+$-type (or p-type) diffused layers 9 formed in a p-type (or n-type) well or substrate 100 and is isolated from the vertical signal line 7 and the drain line 5 by insulating layers 71, 72 and 73.

As apparent from FIGS. 8 and 9, the drain line 5 is large in cross-sectional area or low in resistance as compared with the vertical signal line 7 and the vertical gate line. By thus making low the resistance of the drain line 5 which controls the pixel amplifiers 12 in FIG. 7, a voltage drop at the drain line 5 can be made negligibly small. As a result, noises called shading can be suppressed. This effect is remarkable as the number of pixels in a horizontal direction in a solid-state imaging device having pixel amplifiers is increased. Since the operation of the present embodiment is the same as the operation explained in conjunction with the circuit diagram shown in FIG. 7, any explanation thereof will be omitted.

EMBODIMENT 7

Figure 10A:
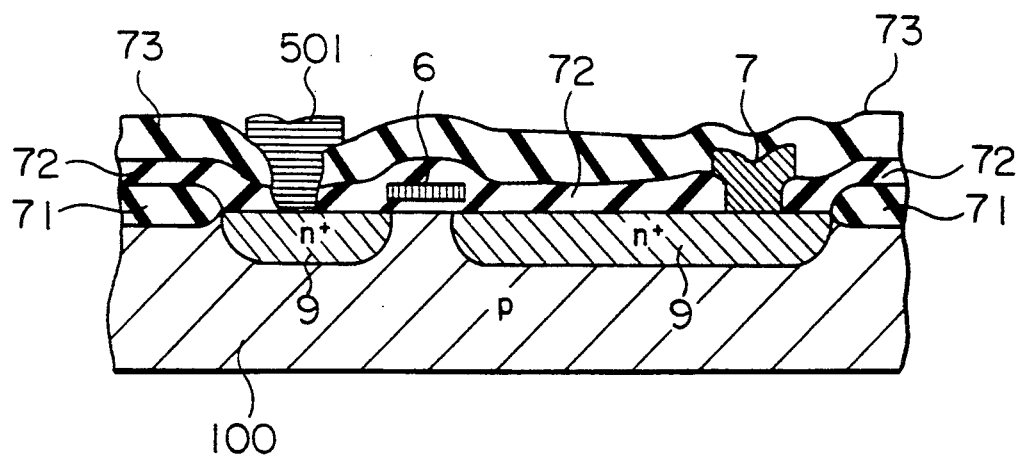
Figure 10B:
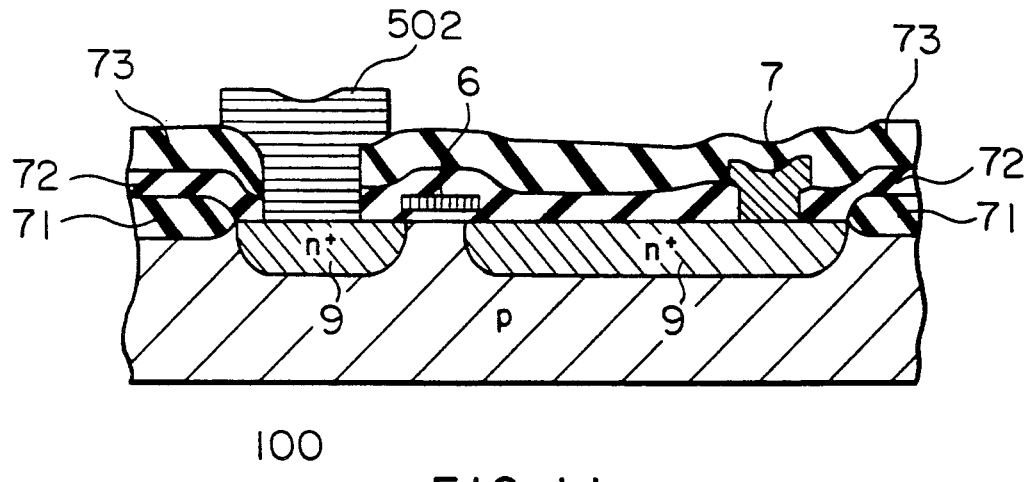
Figure 11:
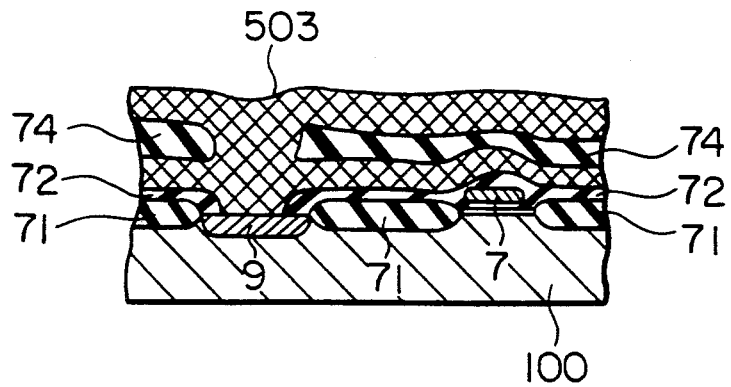
Figure 12:
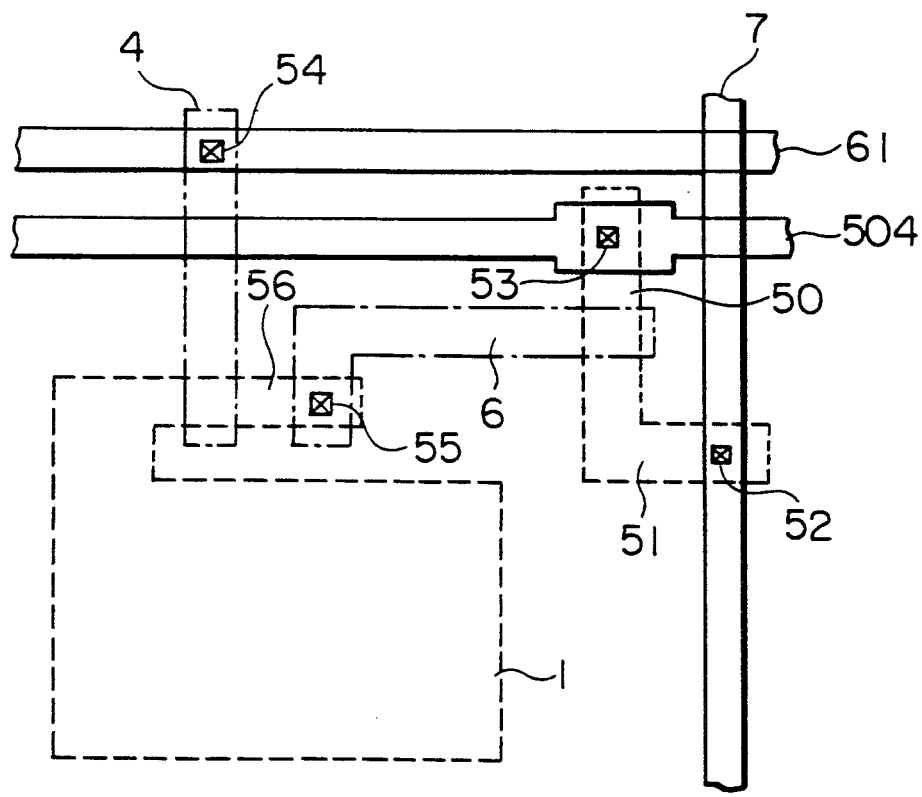
Figure 13:
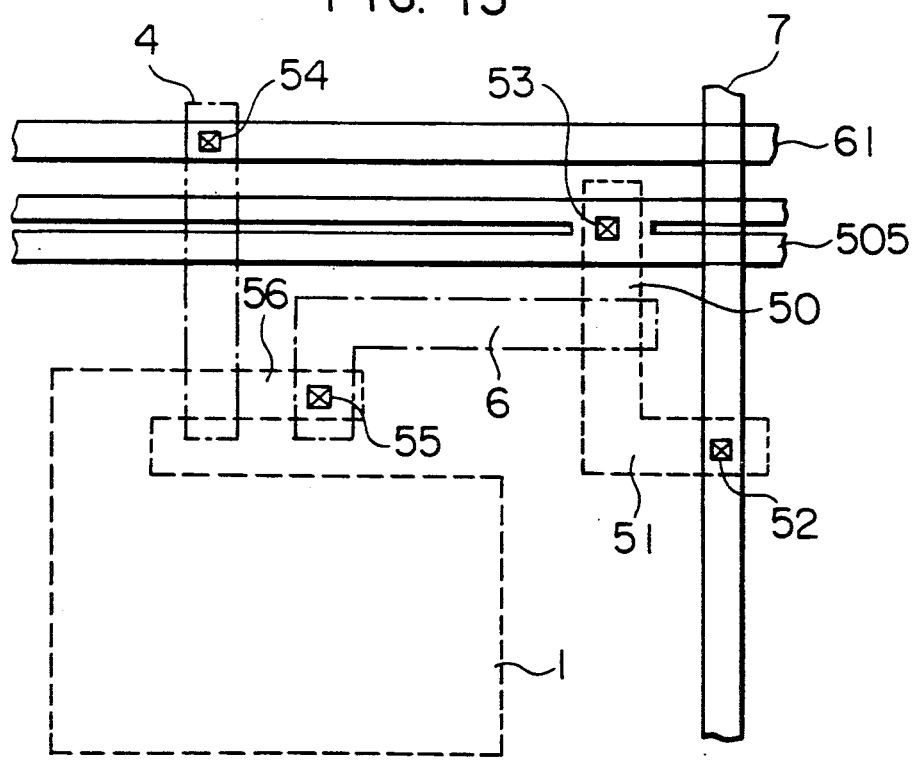

Next, a seventh embodiment of the present invention will be explained. FIG. 10A shows an example in which the resistance of a drain line 501 is made low by using a material such as gold, copper or a superconductor which has a lower resistivity than alumimum. It is apparent that the effect obtained by the example of FIG. 10A is remarkable if the cross-sectional area of the drain line is made large as shown by 502 in FIG. 10B. FIG. 11 showing a part of the cross section taken along line $B_1$-$B_2$ in FIG. 8 corresponds to the case where the resistance of a drain line 503 is made low by forming the line with a two-layer structure made of alumimum. It is, of course, possible that the resistance of a drain line can be made low by using a line consisting of three or more layers made of alumimum in FIG. 11 or by forming a plural-layer line made of a material other than alumimum. FIG. 12 shows an example in which the resistance of a drain line 504 is made low by making the line partially broad or wide. Though the drain line 504 is made wide at only a contact portion in FIG. 12, any portion(s) of the drain line 504 may be made wide so long as that portion does not prove a hindrance to layout. FIG. 13 shows an example in which a drain line 505 is provided with two line parts (which are interconnected with each other at a contact portion). The drain line 505 may be formed by three or more line parts to further lowering the resistance of the drain line. It is, of course, possible that aluminum or a material other than aluminum may be used as the line material.

EMBODIMENT 8

Figure 14:
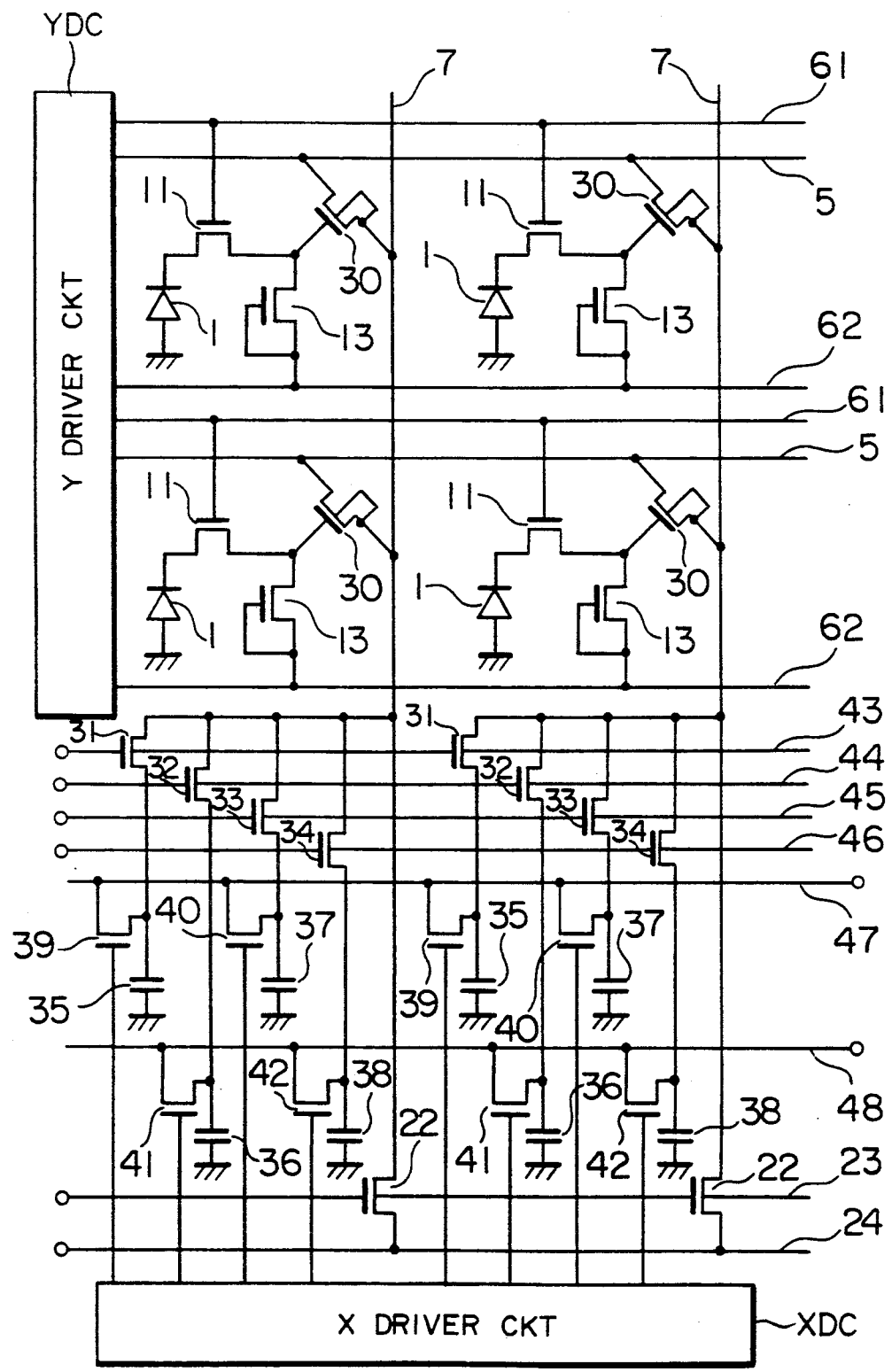
FIGS. 14 to 34 including 32A, 32B are views for explaining ninth to sixteenth embodiments of the present invention.
Figure 15:
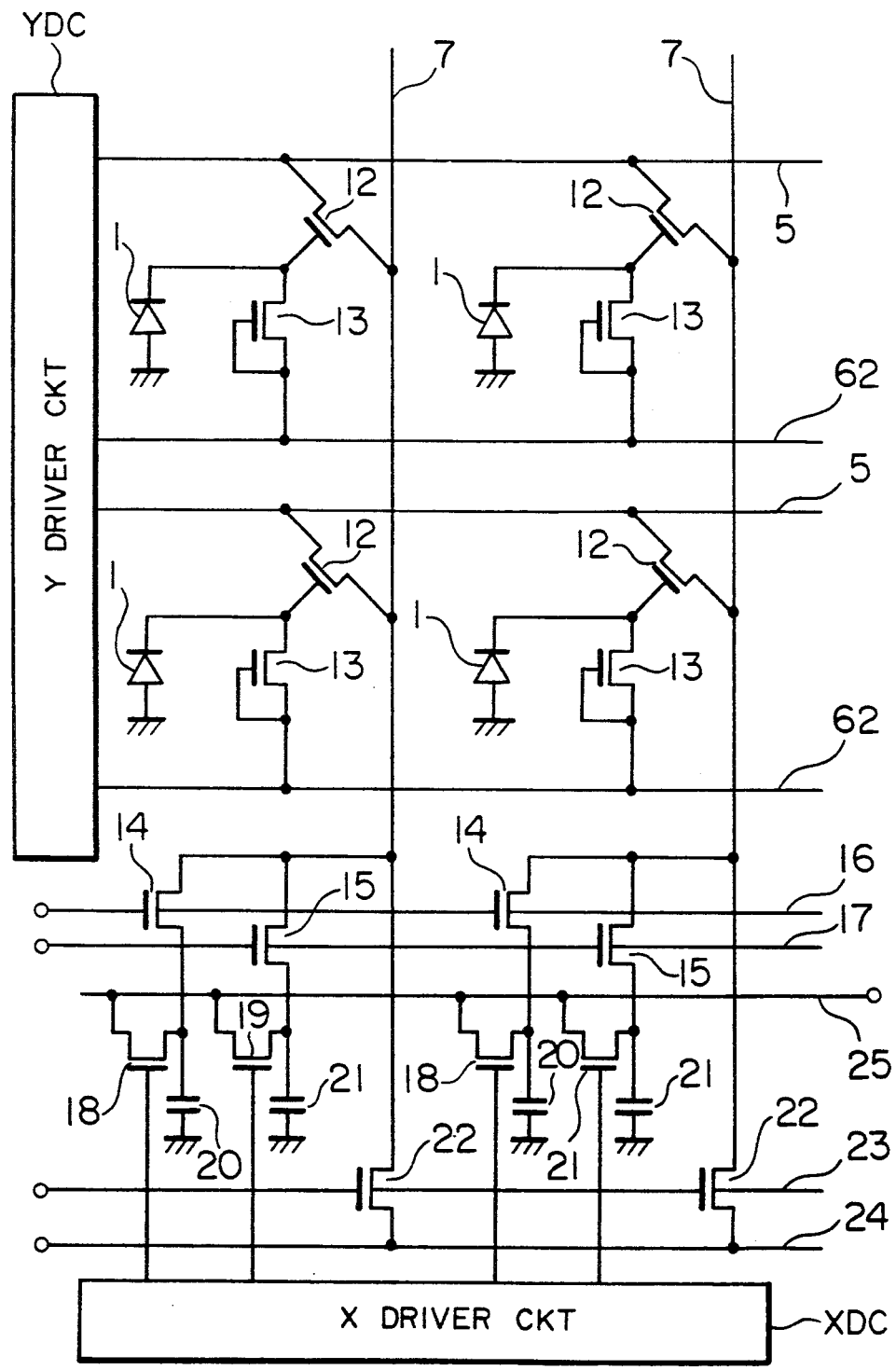
Figure 16:
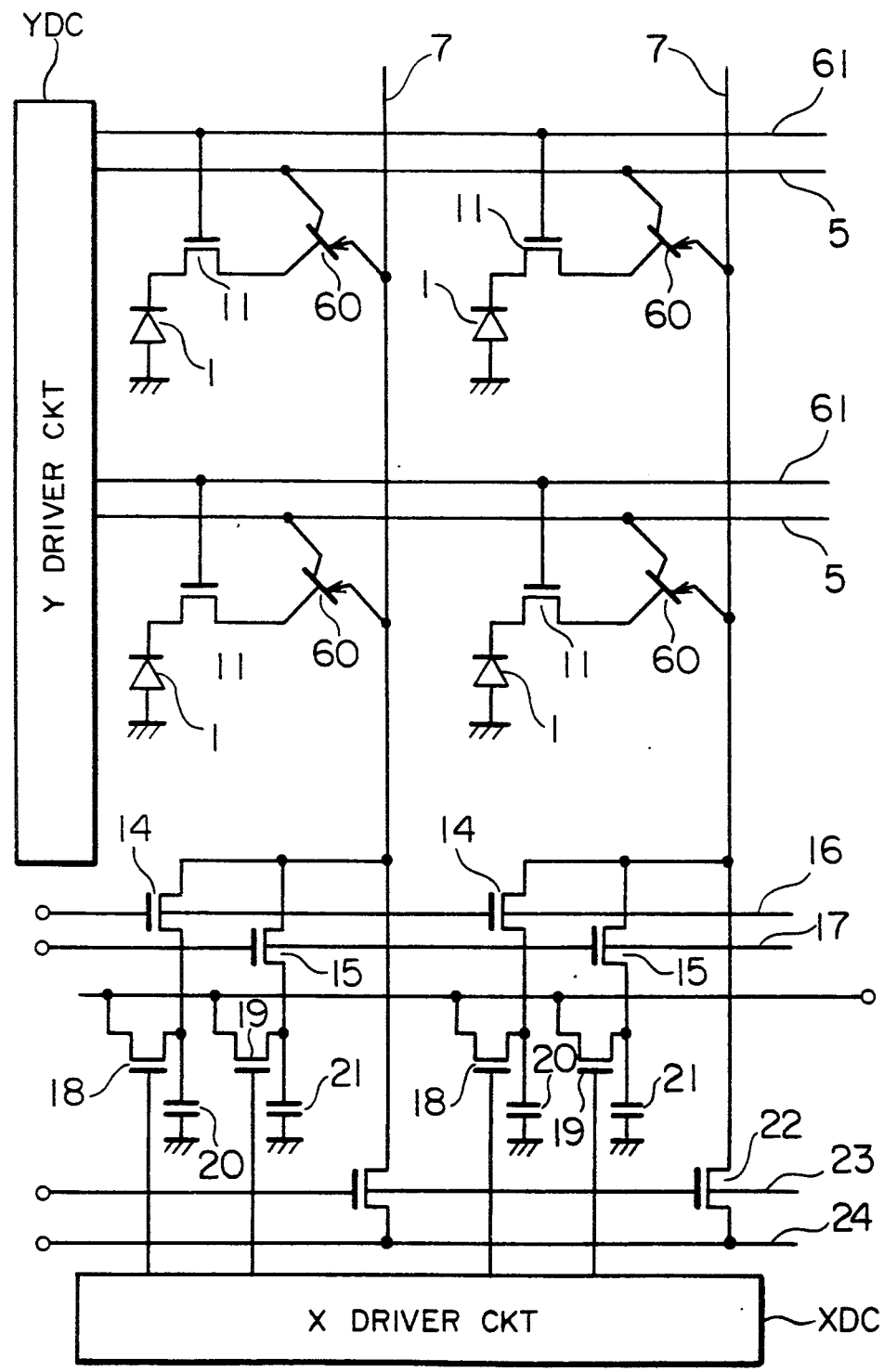
Figure 17:
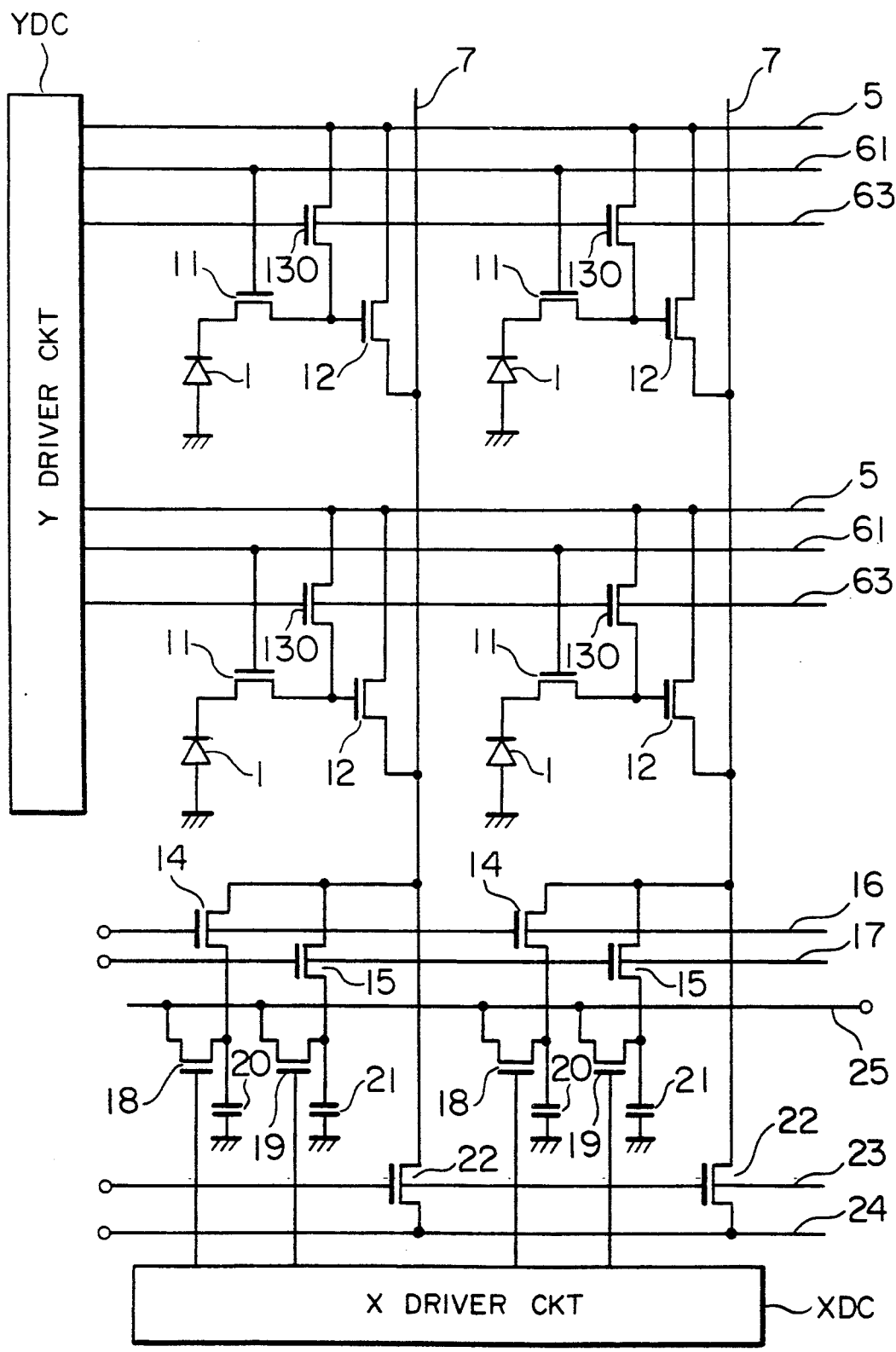

The above seventh embodiment has been explained in conjunction with the circuit construction shown in FIG. 7. The same effect can be obtained in an eighth embodiment of the present invention in which a circuit construction as shown in FIG. 14, 15, 16 or 17 different from the circuit construction shown in FIG. 7 is employed. An example shown in FIG. 14 is the same as the circuit construction of FIG. 7 except that a well of a pixel amplifier transistor 30 is connected to a source and that each of a set of gate switches (31–34), a set of storage capacitors (35–38) and a set of horizontal gate switches (39–42) which is constructed by four components to allow simultaneous two-line read-out in which photoelectric conversion elements or photodiodes in two rows along a horizontal direction are simultaneously scanned. An example shown in FIG. 15 is the same as the circuit of FIG. 7 except that since no vertical gate switch is provided, the output of a pixel amplifier 12 after resetting thereof by a reset switch 13 is stored into a storage capacitor 21 after the output of the pixel amplifier 12 where electric (or signal) charges are present has been stored into a storage capacitor 20. An example shown in FIG. 16 is the same as the circuit construction of FIG. 7 except that a pixel amplifier transistor 60 is a bipolar transistor and no reset switch is provided. An example shown in FIG. 17 is the same as the circuit construction of FIG. 7 except that the drain of a reset switch 130 is made common to the drain of a pixel amplifier transistor 12 and that a gate line 63 is newly provided.

In the sixth to eighth embodiments, the resistance of the drain line is made low as compared with that of the other lines. Therefore, even if pixel amplifiers in one row along a horizontal direction are simultaneously turned on, a voltage drop at the drain line is negligibly small so that shading is suppressed. As a result, there is a high-sensitivity and low-noise solid-state imaging device having a characteristic which is uniform and satisfactory over the whole imaging area.

EMBODIMENT 9

In the embodiment of FIG. 7, no consideration is paid to ultra-high resolution imaging in which the number of pixels in a horizontal direction in a solid-state imaging device is remarkably increased. Therefore, it involves a problem that in the case where an output frequency is increased in a device having an increased number of pixels in the horizontal direction, the reading of amplified signals from storage capacitors cannot be made in a required time, thereby deteriorating an output signal.

The object of a ninth embodiment of the present invention is to provide a solid-state imaging device in which the deterioration of an output signal is hard to take place even with the increased output frequency, thereby making it possible to cope with ultra-high resolution imaging.

The above object can be achieved by a solid-state imaging device comprising a plurality of photoelectric conversion elements two-dimensionally arranged for storing electric (or signal) charges corresponding to light incident thereupon, amplifying means for amplifying the electric charges stored in the photoelectric conversion elements, a plurality of storing means for storing an output of the amplifying means through first switch means, and scanning means for scanning outputs of the storing means through second switch means, characterized in that a resistance of the second switch means upon turn-on thereof is lower than a resistance of the first switch means upon turn-on thereof.

Two contradictory characteristics are required for each of the first and second switches. Namely, it is preferable that the resistance of the switch upon turn-on thereof is lower while the stray capacitance of the switch upon turn-on thereof is smaller. The requirement is preferred since a product of the turn-on resistance of the switch and the value of a storage capacitor governs a time constant when electric charges of the storage capacitor are outputted or inputted through the switch. The second requirement is preferred since electric charges having been stored in the stray capacitance of the switches are not necessarily transferred between the switches and hence electric charges subjected to no transfer results in loss. The reason why the first and second requirements are contradictory to each other is as follows. Consider field effect transistor switch as a typical example of switches. Then, the resistance of the switch upon turn-on thereof is proportional to the number of carriers generated per unit length in a channel while the stray capacitance of the switch upon turn-on thereof is inversely proportional to the number of carriers generated in the whole channel. Accordingly, in order to satisfy simultaneously the first and second requirements, it is preferred that the channel length of the switch is shorter. However, contradictory requirements are imposed on the other design specifications, channel width on gate voltage at MOS on state. From the above, the resistance and stray capacitance of a switch upon turn-on thereof should be selected to have their compromise optimum values.

Next, the optimum values of the resistance and stray capacitance of each of the first and second switches upon turn-on thereof will be mentioned. An operation of the second switch of reading out electric charges from a storage capacitor is made in synchronism with clocks for horizontal scanning. Therefore, it is required that the operating speed of the second switch is faster than a speed for the first switch which is required for performing an operation of inputting the electric charges into the storage capacitance. Namely, it is required that a time constant of the second switch is shorter than that of the first switch. Accordingly, the turn-on resistance of the second switch should be lower than that of the first switch. As for the stray capacitance of a switch upon turn-on thereof, on the other hand, so long as the matter concerns the suppression of loss of electric charges upon transfer thereof by a switch, there is no special reason why either one of the first and second switches should have a stray capacitance smaller than the other switch.

As mentioned above, the turn-on resistance of the second switch should be smaller than that of the first switch while there is no special reason why either one of the first and second switches should have a stray capacitance upon turn-on thereof smaller than the other switch. As a result, the first and second switches have their optimum values different in each of resistance and stray capacitance upon turn-on. Namely, it is preferable that the turn-on resistance of the second switch is lower than that of the first switch. When this condition is satisfied, it is possible to suppress any deterioration of amplified signal output read from a storage capacitor.

The above consideration is effective when the resistance of each of the first and second switches is low as compared with the output resistance of each amplifying means and the output resistance (which are expressed as a parasitic resistance in the claims) of a horizontal signal line.

The ninth embodiment of the present invention will now be explained by virtue of FIGS. 18, 19, 20 and 21.

Figure 20:
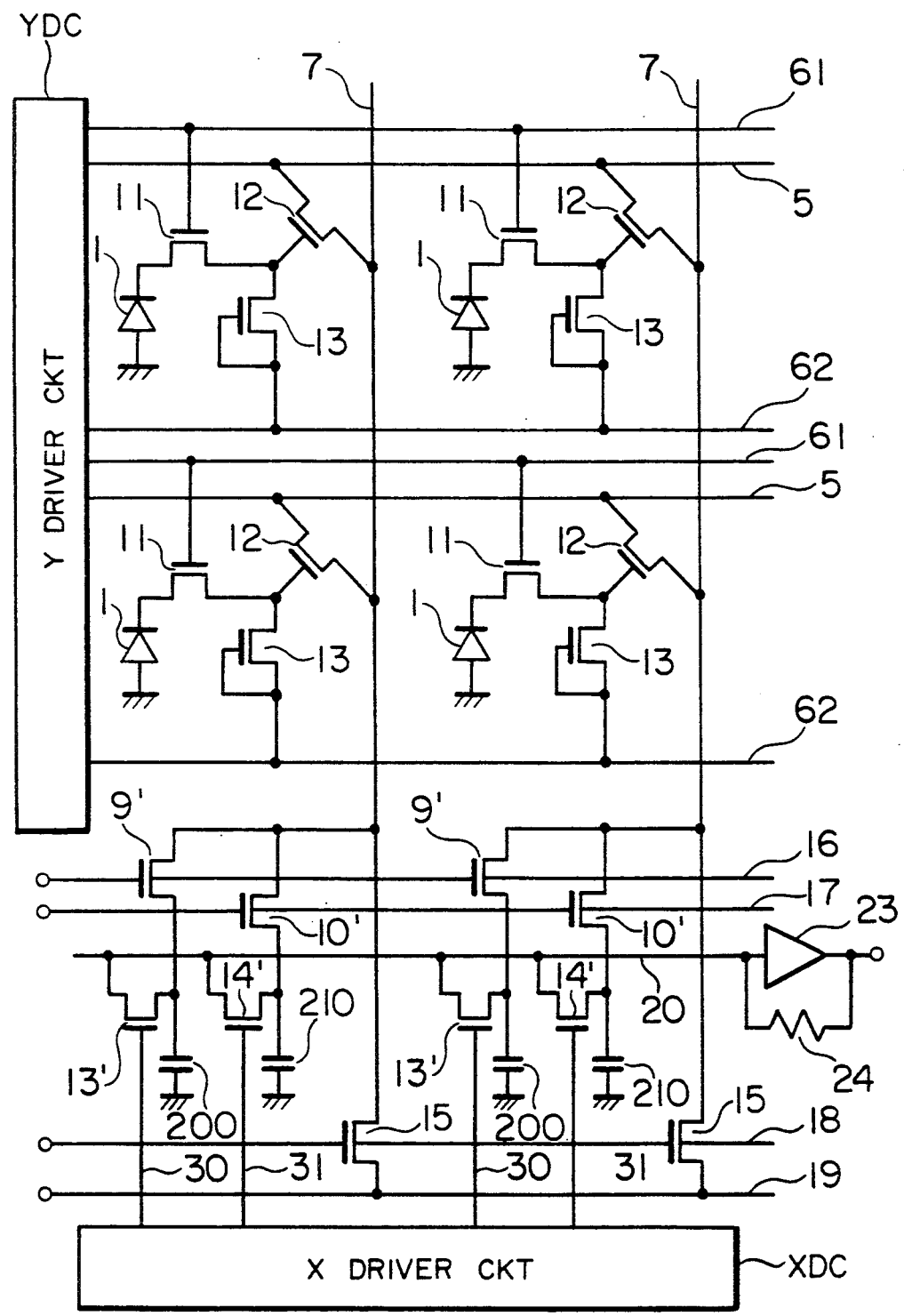

FIG. 20 shows a circuit diagram according to the ninth embodiment. The circuit construction shown in FIG. 20 is the same as the circuit construction of FIG. 7 except that an output amplifier 23 and a feedback resistor 24 are additionally provided at the output end of a horizontal signal line 20. The operation of the circuit of FIG. 20 is the same as the operation of the circuit of FIG. 7 except that an output signal of the horizontal signal line 20 is delivered after amplification thereof by the output amplifier 23 which includes the feedback resistor 24.

Figure 18:
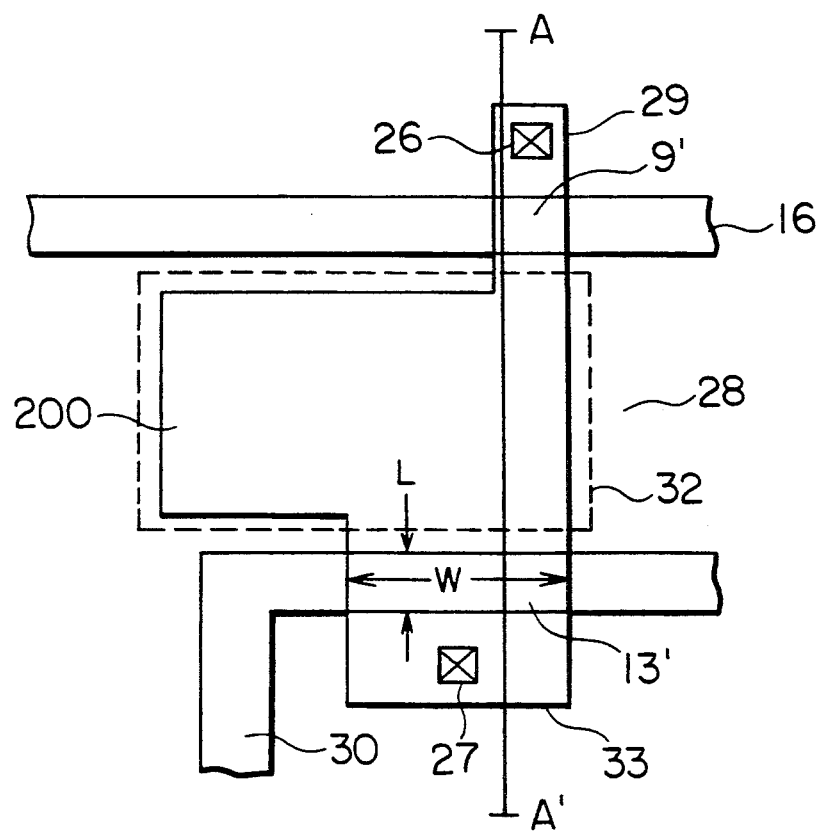

FIG. 18 shows a layout in the vicinity of a storage capacitor 200 in FIG. 20 or more especially, a portion including the storage capacitor 200, an input switch 9' and a horizontal gate switch 13'. In FIG. 18, the input switch 9' is an MOS transistor where the drain, source and gate of which are the storage capacitor 200, an impurity region 29 and a gate line 16, respectively. The horizontal gate switch 13' is an MOS transistor the source, drain and gate of which are the storage capacitor 200, an impurity region 33, a horizontal gate line 30, respectively. A contact 26 interconnects the impurity region 29 and a vertical signal line 7 with each other and a contact 27 interconnects the impurity region 33 and the horizontal signal line 20 with each other. The vertical signal line 7 and the horizontal signal line 20 are omitted from the illustration of FIG. 18. Reference numeral 28 in FIG. 18 designates an isolation region by which isolation between the impurity regions is made. A layout in the vicinity of a storage capacitor 210 in FIG. 20 is similar to the layout shown in FIG. 18.

Figure 19:
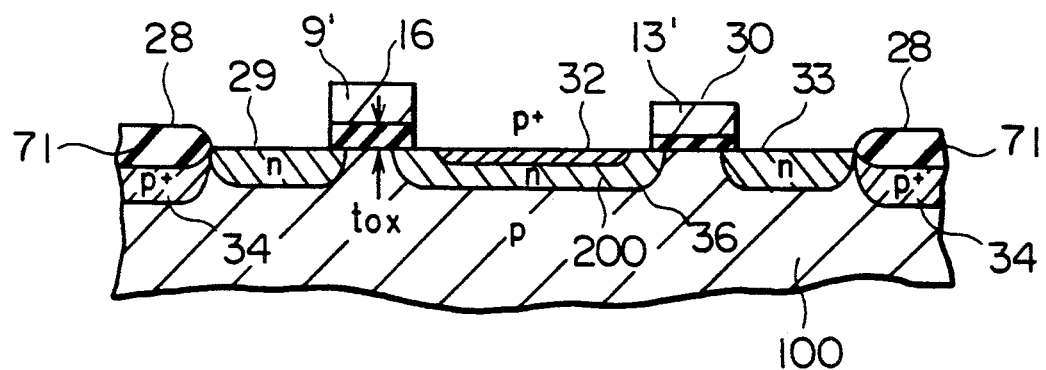

FIG. 19 shows a cross section taken along line A—A' in FIG. 18. The isolation region 28 includes an insulating film 71 and a p+-type impurity region 34. The storage capacitor 200 includes an n-type impurity region 36, a p+-type diffused layer 32 and a p-type well or substrate 100. Insulating films between the layers on the substrate are omitted from the illustration of FIG. 19.

The voltage versus current characteristic of an MOS transistor in a non-saturated operating region where the MOS transistor is used as a switch can be represented by the following equation:

$$I_{DS} = \frac{W}{L} \mu \frac{\epsilon_{OX}}{t_{OX}} \left( (V_G - V_{th})V_D - \frac{1}{2} V_D^2 \right) \quad (5)$$

Here, $I_{DS}$ is a drain-source current, W the gate width, L the gate length, $\mu$ the carrier mobility, $\epsilon_{OX}$ the permittivity in gate oxide, $t_{OX}$ the thickness of gate oxide, $V_G$ the gate voltage, $V_{th}$ the threshold voltage, and $V_D$ the drain voltage. In the case where the drain voltage $V_D$ is relatively small as in a switch in its ON state, the equation (5) can be approximated to $$I_{DS} = \frac{W}{L} \mu \frac{\epsilon_{OX}}{t_{OX}} (V_G - V_{th})V_D \quad (6)$$

Since the resistance $R_{ON}$ of this switch upon turn-on thereof is $V_D/I_{DS}$, the following equation (7) can be obtained from the equation (6):

$$\frac{1}{R_{ON}} = \frac{W}{L} \mu \frac{\epsilon_{OX}}{t_{OX}} (V_G - V_{th}) \quad (7)$$

Accordingly, in order to making the turn-on resistance $R_{ON}$ of the MOS transistor low can be considered the following measures (1) to (3):
(1) to make W/L large;
(2) to make $t_{OX}$ small; and
(3) to make $(V_G - V_{th})$ large.

Since it is preferable that the channel length or gate length L of each of the input switch 9' and the horizontal gate switch 13' is short, as has already been mentioned, the gate length L of each of those switches in FIGS. 18 and 19 is set to the minimum gate length dimension following the rules of layout. From FIG. 18, it can be seen that the gate width W of the horizontal gate switch 13' is made larger than the gate width W of the input switch 9' in accordance with the measure (1). From FIG. 19, it can be seen that the gate oxide thickness $t_{OX}$ of the horizontal gate switch 13' is made smaller than the gate oxide thickness $t_{OX}$ of the input switch 9' in accordance with the measure (2). Though not shown in FIGS. 18 and 19, $(V_G - V_{th})$ for the horizontal gate switch 13' is set to a value larger than $(V_G - V_{th})$ for the input switch 9' in accordance with the measure (3).

The measures (1) to (3) are all satisfied in the above embodiment. However, it is apparent that an effect proportionate to the effect of the above embodiment can be obtained if at least one of the three measures is satisfied. This holds for the embodiment number 10, 12 to 16.

In the case where an MOS transistor is used for a switch as in the present embodiment and the MOS transistor used is of an enhancement type, there is the advantage that it is not necessary to use a negative voltage for the gate.

Preferably, the resistance $R_2$ of the input switch 9' upon turn-on thereof is set such that a time constant for storage of the storage capacitor 200 determined by a product of the turn-on resistance $R_2$ of the input switch 9' and the capacitance value C of the storage capacitor 200 becomes smaller than a time constant for operation of the pixel amplifier 12 determined by a product of the output resistance $R_1$ of the pixel amplifier transistor 12 and a stray capacitance $C_1$ of the vertical signal line 7. Under such a condition, a time constant of the whole system extending from the pixel amplifier 12 to the storage capacitor 200 can be substantially reduced to the time constant for operation of the pixel amplifier transistor 12.

Figure 21:
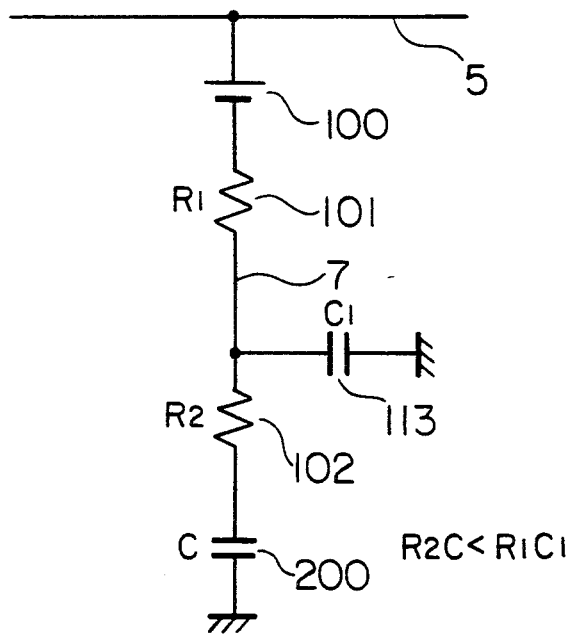

FIG. 21 shows an equivalent circuit of a system which includes one pixel amplifier 12, one vertical signal line 7, one input switch 9', one storage capacitor 200 and so on in FIG. 20. In FIG. 21, a voltage source 100 connected to the drain line 5 is an equivalent voltage source of the pixel amplifier 12, a resistor $R_1$ connected to the voltage source 100 is an output resistance 101 of the pixel amplifier, a capacitance $C_1$ of the vertical signal line 7 is a stray capacitance 113 of the vertical signal line, and the vertical signal line 7 and the storage capacitor 200 are connected by the turn-on resistance $R_2$ or 102 of the input switch 9'. In order to make the time constant for storage of the storage capacitor 200 smaller than the time constant for operation of the pixel amplifier 12, as mentioned above, the turn-on resistance $R_2$ of the input switch 9' is set so as to satisfy a relation of $$R_2C < R_1C_1 \tag{8}$$

On the other hand, the same can be said for the turn-on resistance $R_3$ of the horizontal gate switch 13'. Namely, it is preferable that the turn-on resistance $R_3$ of the horizontal gate switch 13' is set such that a time constant for output of the storage capacitor 200 determined by a product of the turn-on resistance $R_3$ of the horizontal gate switch 13' and the capacitance value C of the storage capacitor 200 becomes smaller than a time constant for read-out of the output amplifier 23 determined by a product of an input resistance $R_4$ of the output amplifier 23 with the feedback resistor 24 and a stray capacitance $C_4$ of the horizontal signal line 20. Under such a condition, a time constant of the whole system extending from the storage capacitor 200 to the output amplifier 23 can be substantially reduced to the time constant for read-out of the output amplifier 23.

Figure 22:
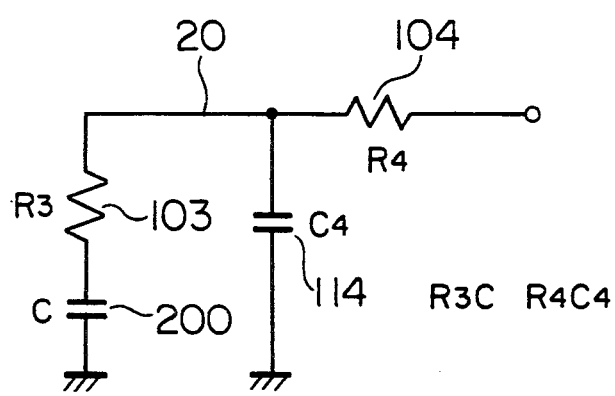

FIG. 22 shows an equivalent circuit of a system which includes one storage capacitor 200, one horizontal gate switch 13', the horizontal signal line 20 and the output amplifier 23 having the feedback resistor 24 in FIG. 20. In FIG. 22, the storage capacitor 200 having a capacitance C and the horizontal signal line 20 are connected by the turn-on resistance $R_3$ or 103 of the horizontal gate switch 13'. To one end of the horizontal signal line 20 are connected a stray capacitance 114 of the horizontal signal line which has a capacitance $C_4$ and the input resistance $R_4$ or 104 of the output amplifier 23 which has the feedback resistor 24. In order to make the time constant for output of the storage capacitor 200 smaller than the time constant for read-out of the output amplifier 23, the turn-on resistance $R_3$ of the horizontal gate switch 13' is set so as to satisfy a relation of $$R_3C < R_4C_4 \tag{9}$$

EMBODIMENT 10

A tenth embodiment of the present invention will be explained by virtue of FIGS. 23, 24, 25 and 26.

Since the circuit diagram, the layout in the vicinity of a storage capacitor 200 and the cross-sectional structure in the present embodiment are the same as those shown in FIGS. 20, 18 and 19 and the operation of the present embodiment ten is the same as the operation of the ninth embodiment explained in conjunction with FIG. 22, any explanation thereof will be omitted.

Figure 23:
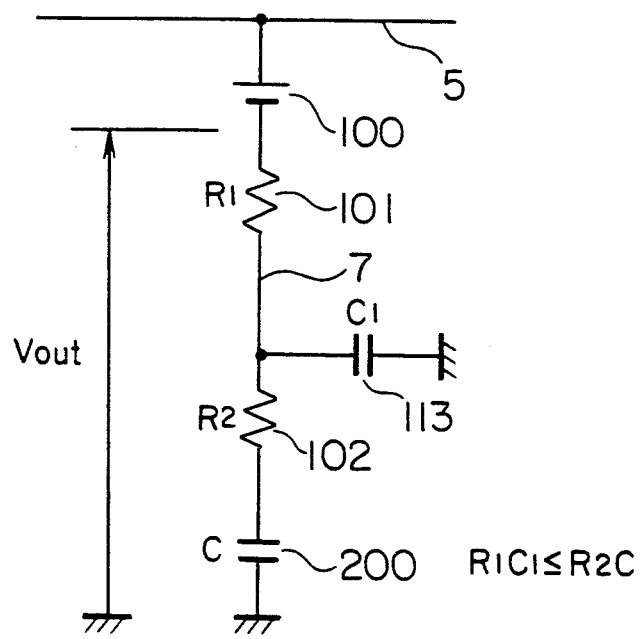

FIG. 23 shows an equivalent circuit of a system which includes one pixel amplifier 12, one vertical signal line 7, one input switch 9', one storage capacitor 200 and so on. FIG. 23 corresponds to FIG. 21. In the present embodiment, the above relation (8) is not satisfied but the following relation (10) is satisfied:

$$R_1C_1 \leq R_2C \tag{10}$$

In the case of the present embodiment, the turn-on resistance $R_2$ of an input switch 9' must be set taking a storaging period of the storage capacitor also into consideration. This will be explained hereinbelow.

Figure 25:
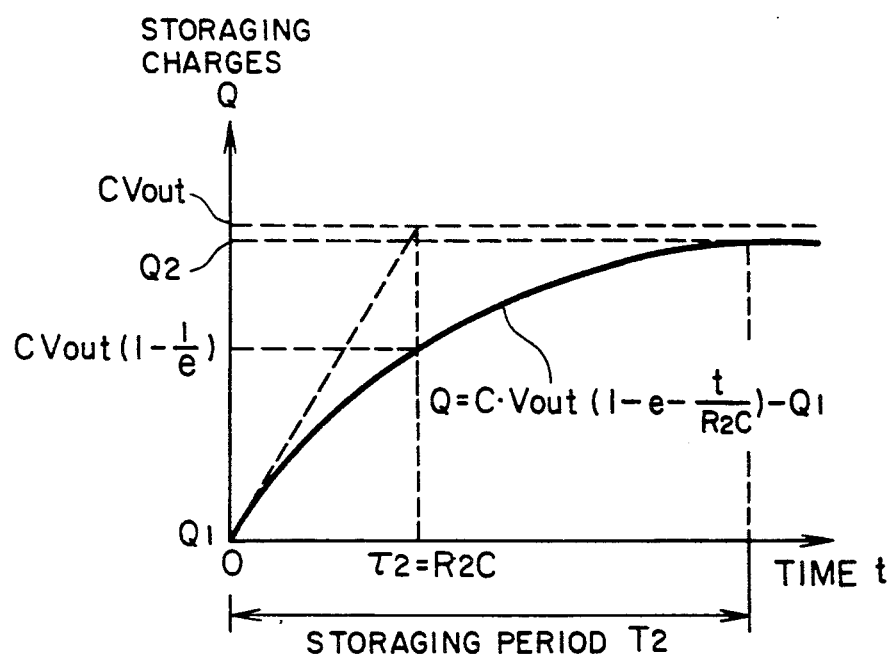

FIG. 25 shows a process in which electric charges are stored into the storage capacitor 200 with the lapse of time. In FIG. 25, the abscissa represents the time and the ordinate represents the storing charges of the storage capacitor 200. In FIG. 25, $R_1C_1 << R_2C$ is assumed for simplification of explanation. As shown in FIG. 25, the storing charges Q of the storage capacitor 200 with respect to time t is given by $$Q = C \cdot V_{out}(1 - e^{-\frac{t}{R_2C}}) + Q_1 \tag{11}$$

where $Q_1$ is the storing charges of the storage capacitor 200 at an instant of time (t=0) at which the storage capacitor 200 starts to store the electric charges thereinto, and $V_{out}$ is an output voltage of the pixel amplifier 12 shown in FIG. 23. The equation (11) involves a time constant $\tau_2$ which is equal to $R_2C$. Accordingly, in order to cause the electric charges to store into the storage capacitor 200, $R_2$ must be set such that a relation of $$R_2C = \tau_2 \leq T_2 \tag{12}$$

is satisfied between the time constant $\tau_2$ and a storaging period $T_2$ of the storage capacitor 200.

In FIG. 25, the extreme case of $R_1C_1 << R_2C$ has been assumed for each understanding of explanation. However, a similar concept is approximately effective also for a general case of $R_1C_1 < < R_2C$.

Figure 24:
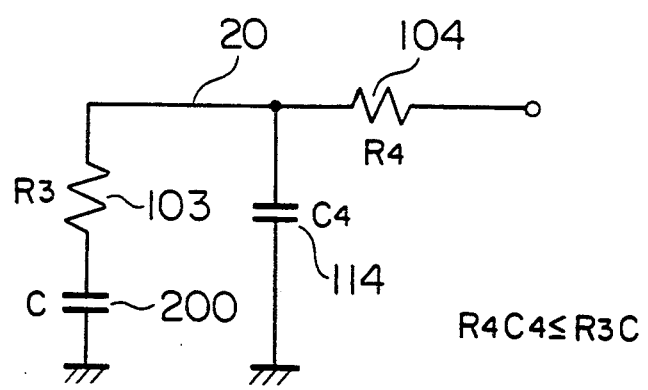

FIG. 24 shows an equivalent circuit of a system which includes one storage capacitor 200, one horizontal gate switch 13', a horizontal signal line 20 and an output amplifier 23 having a feedback resistor 24. FIG. 24 corresponds to FIG. 22. In the present embodiment, the above relation (9) is not satisfied but the following relation (13) is satisfied:

$$R_4C_4 \leq R_3C \tag{13}$$

In the case of the present embodiment, the turn-on resistance $R_3$ of a horizontal gate switch 13' must be set taking an output period of the storage capacitor 200 also into consideration. This will be explained hereinbelow.

Figure 26:
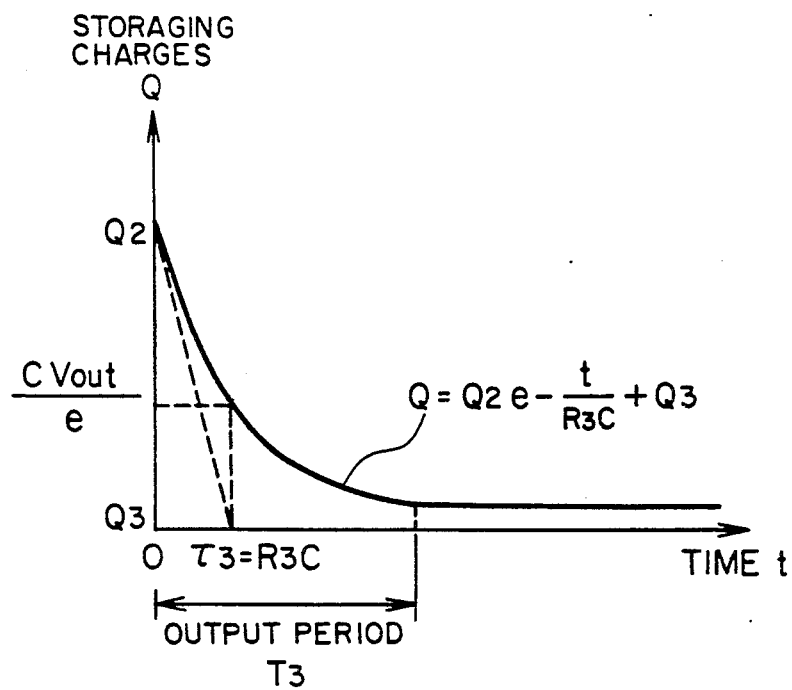

FIG. 26 shows a process in which electric charges are discharged from the storage capacitance 200 with the lapse of time. The abscissa of FIG. 26 represents the time and the ordinate thereof represents the storing charges of the storage capacitor 200. In FIG. 26, $R_4C_4 << R_3C$ is assumed for simplification of explanation. As shown in FIG. 26, the storing charges Q of the storage capacitor 200 with respect to time t is given by $$Q = Q_2 e^{-\frac{t}{R_2C}} + Q_3 \tag{14}$$

where $Q_2$ is the storing charges of the storage capacitor 200 at the start (t=0) of the output period thereof, and $Q_3$ is the storing charges of the storage capacitor 200 at t=∞ depending on a read-out voltage of the output amplifier 23. A time constant $\tau_3$ of the equation (14) is $R_3C$. Accordingly, in order to cause the electric charges to output from the storage capacitor 200, $R_3$ must be set such that a relation of $$R_3C = \tau_3 \leq T_3 \quad (15)$$

is satisfied between the time constant $\tau_3$ and the output period $T_3$ of the storage capacitor 200.

In FIG. 26, the extreme case of $R_4C_4 << R_3C$ has been assumed for easy understanding of explanation. However, a similar concept is approximately effective also for a general case of $R_4C_4 \leq R_3C$.

EMBODIMENT 11

An eleventh embodiment of the present invention will be explained by virtue of FIGS. 27, 28 and 29.

Figure 29:
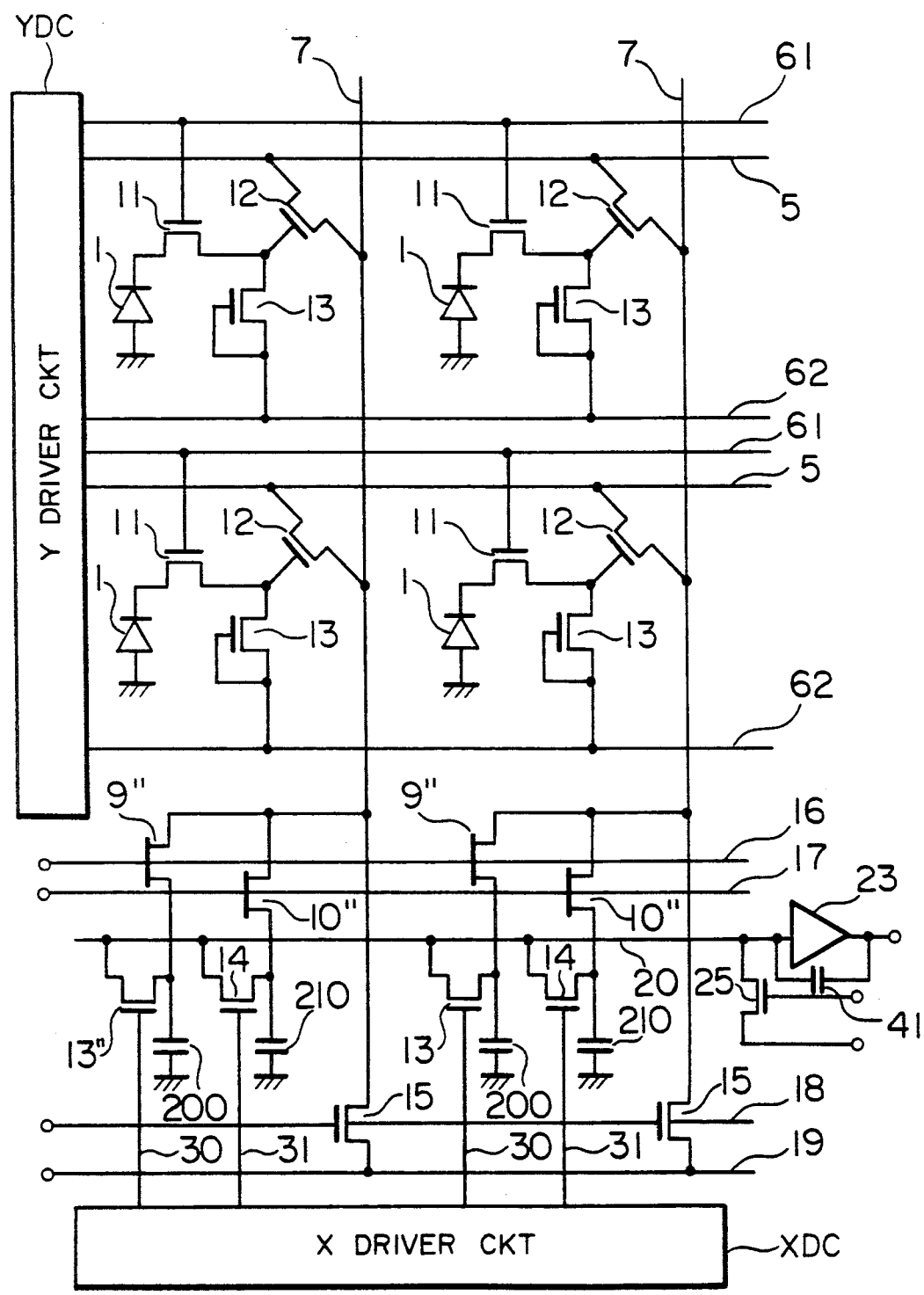

FIG. 29 shows a circuit diagram according to the eleventh embodiment. The circuit construction and operation of FIG. 29 are the same as those of FIG. 20 except that an output amplifier reset switch 25 for signal reset is provided at an end of a horizontal signal line 20 to perform the resetting of the horizontal signal line 20 at a timing for read-out of each pixel or another timing, that a feedback capacitor 41 is provided in place of a feedback resistor 22 and that an input switch 9" and a horizontal gate switch 13" are constructed by JFET's (junction type field effect transistors).

Figure 27:
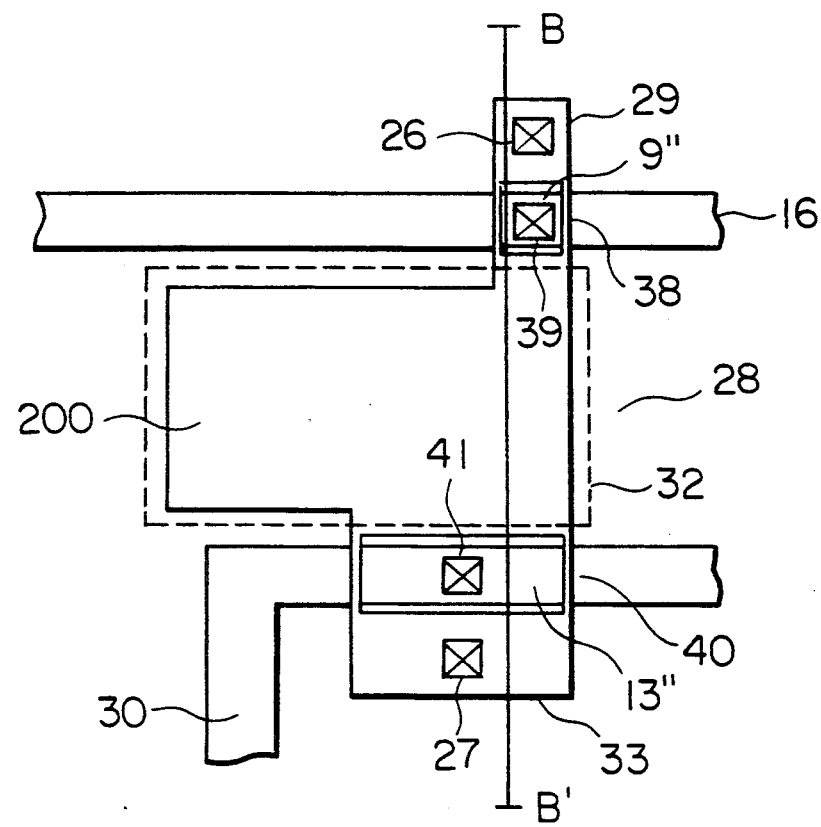

FIG. 27 shows a layout in the vicinity of a storage capacitor 200 in FIG. 29. FIG. 27 is the same as FIG. 18 except that the input switch 9" is a JFET the drain, source and gate of which are the storage capacitor 200, an impurity diffused layer 29 and a gate 38 of the input switch connected to a gate line 16 through a contact 39, respectively, and the horizontal gate switch 13" is a JFET the source, drain and gate of which are the storage capacitor 200, an impurity diffused layer 33 and a gate 40 of the horizontal gate switch connected to the horizontal gate switch through a contact 41, respectively.

Figure 28:
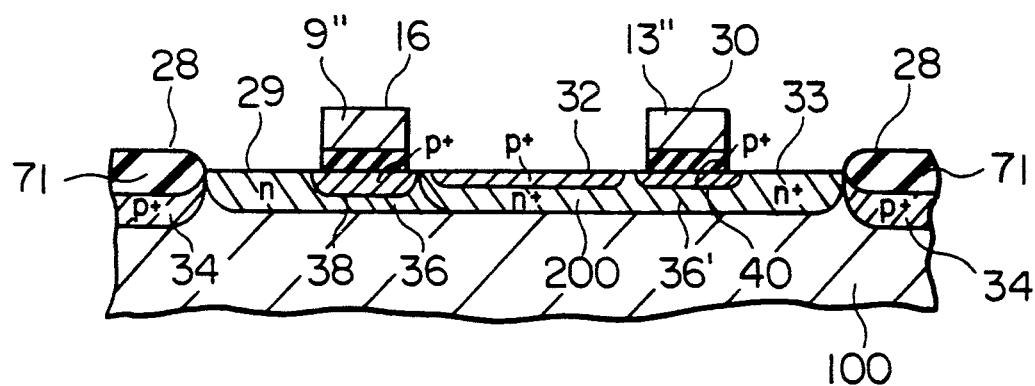

FIG. 28 shows a cross section taken along line B—B' in FIG. 27. FIG. 28 is the same as FIG. 19 except that the input switch 9" and the horizontal gate switch 13" are JFET's, as has already been mentioned.

Like the case of the MOS transistor explained in conjunction with the tenth embodiment, the resistance $R'_{ON}$ of a JFET switch upon turn-on thereof can be represented by the following equation:

$$\frac{1}{R_{ON'}} = 2 \frac{W}{L} \mu \sqrt{2\epsilon_{Si} qN} (\sqrt{V_p} - \sqrt{V_D + V_G + V_{bi}}) \quad (16)$$

Here, $\epsilon_{Si}$ is the permittivity in silicon, q is the unit charge amount, N the impurity concentration of a channel layer, $V_{bi}$ a barrier potential difference between the channel layer and a gate impurity layer, $V_p$ the pinch-off voltage equal to $$\frac{qNa^2}{2\epsilon_{Si}}$$

and a the length of a depletion layer extending from the gate impurity layer at an instant of time when the switch is turned off. Accordingly, in order to make the turn-on resistance R of the JFET small one can consider the following measures (A) to (D):

(A) to make W/L large;
(B) to make N large;
(C) to make a large; and
(D) to bring $(V_D + V_G + V_{bi})$ into approximately zero.

In the present embodiment too, the gate length L is set to a value as small as possible. In FIG. 27, the gate width W of the horizontal gate switch 13" is made larger than that of the input switch 9", which follows the measure (A). In FIG. 28, a channel layer 36' of the horizontal gate switch (JFET) 13" is larger in impurity concentration and in thickness in longitudinal direction of channel than a channel layer 36 of the input switch (JFET) 9", which follows the measures (B) and (C). Though not shown in FIGS. 27 and 28, $(V_D + V_G + V_{bi})$ for the horizontal gate switch 13" is brought nearer into zero as compared with $(V_D + V_G + V_{bi})$ for the input switch 9" so that the measure (D) is satisfied.

In the above embodiment, the measures (A) to (D) are all satisfied. However, it is apparent that an effect proportionate to the effect of the above embodiment can be obtained if at least one of the four measures is satisfied. This holds for the other similar embodiments.

The ninth to eleventh embodiments have been explained in conjunction with the case where the input switch and the horizontal gate switch are MOS transistors, the case where those switches are JFET's, the case where the output amplifier 23 has the feedback resistor 24 and the case where the output amplifier 23 has the feedback capacitor 41. However, any combination of the switches and the feedback elements may be employed. Also, even if the impurity conductivity (p and n) types may be reversed, a similar effect can be obtained by reversing the positive and negative signs of a voltage. Further, though the insulating film 35 has been used for a region for isolation between elements, the present invention is effective even if a field plate method is used in which isolation between elements is made by a field MOS transistor.

In the foregoing embodiments, the inputting of signals into the storage capacitors is made en bloc for each of a group including the storage capacitors 200 and a group including the storage capacitors 210 and the read-out of signals from all the storage capacitors is made successively one by one. However, embodiments having circuit constructions which will be mentioned below are possible.

EMBODIMENT 12

A twelfth embodiment of the present invention will be explained by virtue of FIG. 30.

Figure 30:
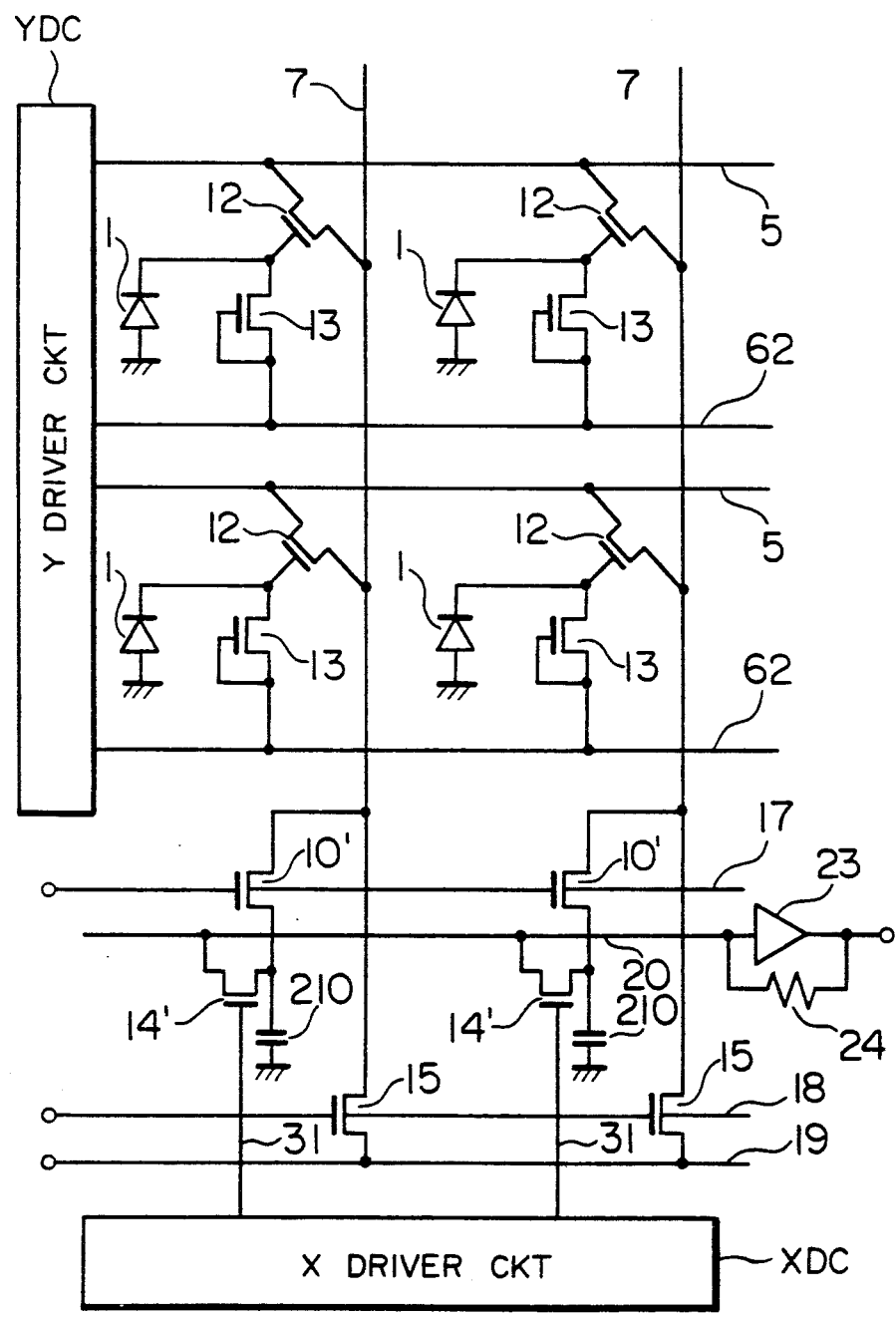

FIG. 30 is a circuit diagram showing the construction of the twelfth embodiment. Since a view showing a layout in the vicinity of a storage capacitor 210 in FIG. 30 and a view showing the cross section thereof are similar to FIGS. 18 and 19, these views will be omitted.

The circuit construction of the embodiment shown in FIG. 30 is the same as the circuit construction of the embodiment of FIG. 20 except that a vertical gate switch 11 controlled by a vertical gate line 61, an input switch 9' controlled by a gate line 16, a storage capacitor 200, and a horizontal gate switch 13' controlled by a horizontal gate line 30 are not provided. In the embodiment shown in FIG. 20, the output signals of the pixel amplifier 12 before and after electric charges are applied to the gate of the pixel amplifier 12 through the vertical gate switch 11 are stored in the storage capacitors 200 and 210, respectively. However, in the present embodiment shown in FIG. 30, the output signals of one storage capacitor 12 are stored in the storage capacitor 210. The operation of the embodiment shown in FIG. 30 is the same as the operation of the embodiment of FIG. 20 excepting the above-mentioned difference. The present embodiment has merits that since the horizontal scanning frequency of a horizontal scanning circuit or X driver circuit XDC is a half of that in the embodiment of FIG. 20, the driving of the imaging can be facilitated and that since the number of transistors included in each pixel is reduced by one, the area of a photoelectric conversion element or photodiode 1 can be made large, thereby improving the sensitivity.

EMBODIMENT 13

A thirteenth embodiment of the present invention will be explained by virtue of FIG. 31.

Figure 31:
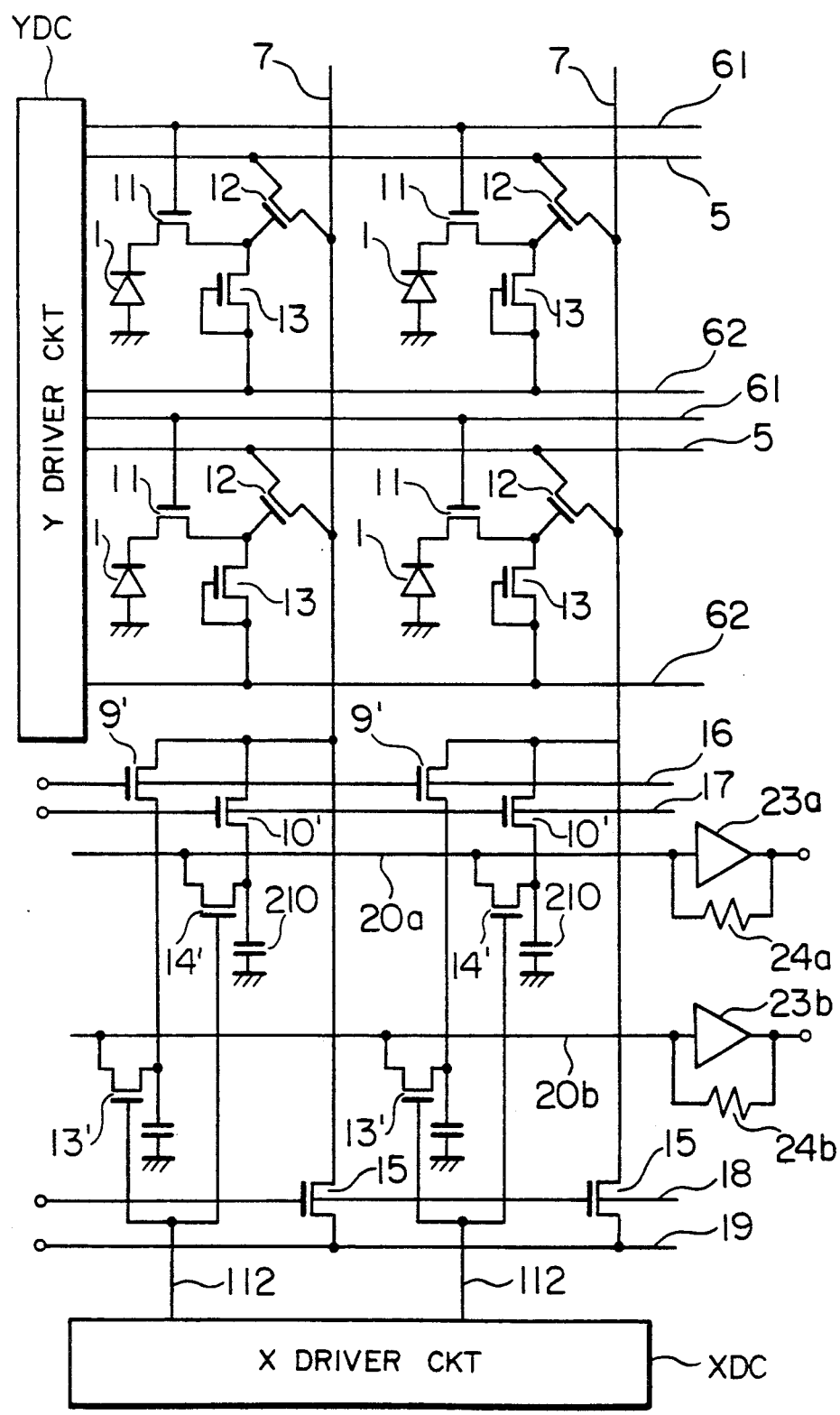

FIG. 31 is a circuit diagram showing the construction of the thirteenth embodiment. Since a view showing a layout in the vicinity of a storage capacitor 200 in FIG. 31 and a view showing the cross section thereof are similar to FIGS. 18 and 19, these views will be omitted.

The circuit construction of the present embodiment shown in FIG. 31 is the same as the circuit construction of the embodiment of FIG. 20 except that horizontal gate switches 13' and 14' are simultaneously scanned by one horizontal gate line 112 and that the drain of the horizontal gate switch 14' is connected through a horizontal signal line 20a to an output amplifier 23a having a feedback resistor 24a while the drain of the horizontal gate switch 13' is connected through a horizontal signal line 20b to an output amplifier 23b having a feedback resistor 24b. The operation of the present embodiment shown in FIG. 31 is similar to the operation of the embodiment of FIG. 20 except that a signal outputted from the storage capacitor 210 and a signal outputted from the storage capacitor 200 are respectively outputted from the output amplifiers 23a and 23b at the same timing in a horizontal scanning period. The present embodiment has merits that since the horizontal scanning frequency of a horizontal scanning circuit or X driver circuit XDC is a half of that in the embodiment of FIG. 20, the driving of the imaging device can be facilitated and that since two output signals to be subtracted from each other are obtained from separate output terminals at the same timing, a differential signal can be easily obtained without delayed processing of the output signals.

EMBODIMENT 14

A fourteenth embodiment of the present invention will be explained by virtue of FIG. 32A.

Figure 32A:
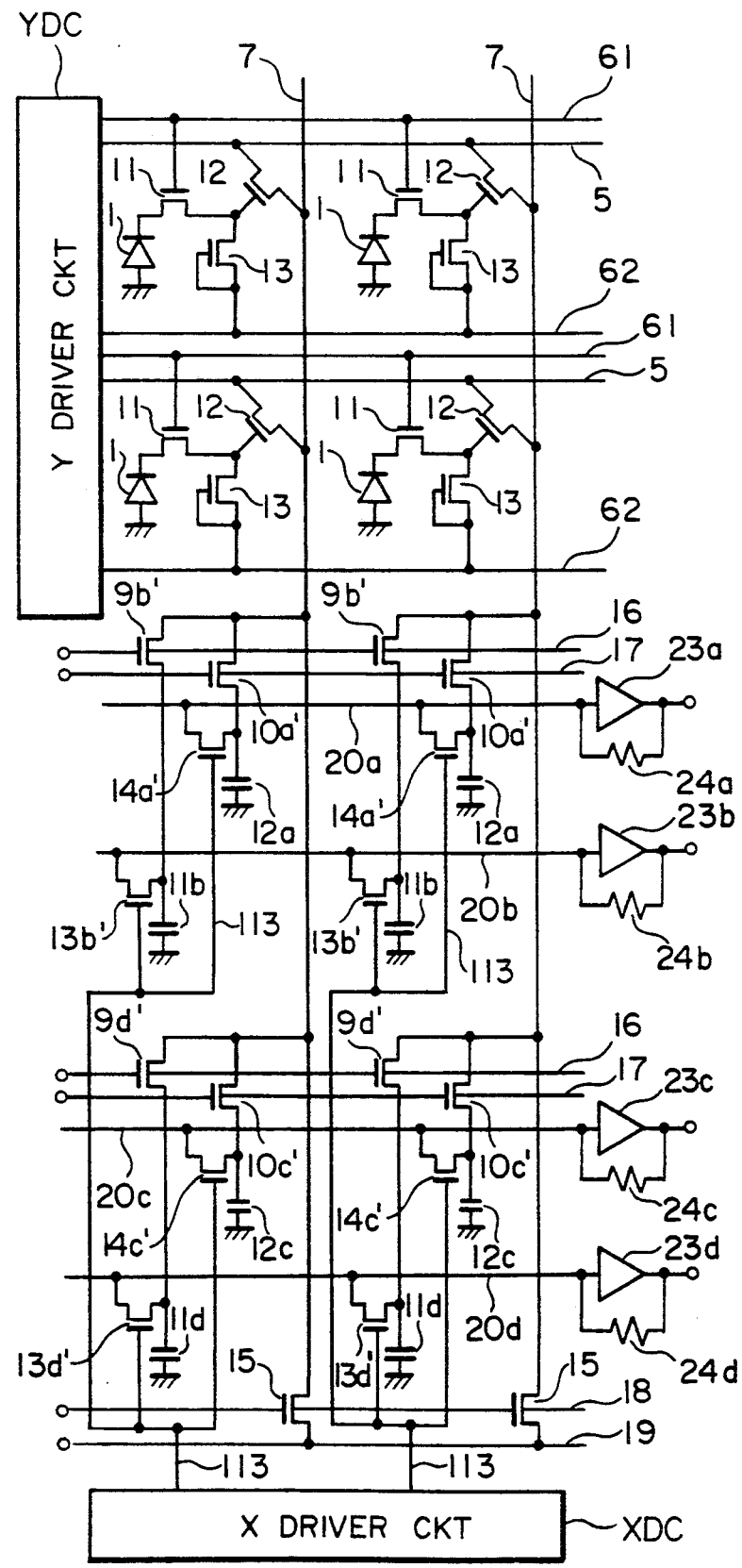

FIG. 32A is a circuit diagram showing the construction of the fourteenth embodiment. Since a view showing a layout in the vicinity of storage capacitors 12a, 11b, 12c and 11d in FIG. 32A and a view showing the cross section thereof are similar to FIGS. 18 and 19, these views will be omitted.

In the present embodiment shown in FIG. 32A, horizontal gate switches 14a', 13b', 14c' and 13d' are simultaneously scanned by one horizontal gate line 113. The drain of the horizontal gate switch 14a' is connected through a horizontal signal line 20a to an output amplifier 23a having a feedback resistor 24a. The drain of the horizontal gate switch 13b' is connected through a horizontal signal line 20b to an output amplifier 23b having a feedback resistor 24b. The drain of the horizontal gate switch 14c' is connected through a horizontal signal line 20c to an output amplifier 23c having a feedback resistor 24c. The drain of the horizontal gate switch 13d' is connected through a horizontal signal line 20d to an output amplifier 23d having a feedback resistor 24d. Thus, the present embodiment has four rows of respective storage capacitors 12a, 11b, 12c and 11d whereas the embodiment shown in FIG. 31 has two rows of respective storage capacitors 210 and 200. Accordingly, in the present embodiment, output signals of pixels in two rows can be stored in the storage capacitors 12a, 11b, 12c and 11d in a horizontal blanking period and the signals stored in the four storage capacitors are outputted from the four output amplifiers 23a, 23b, 23c and 23d at the same timing in a horizontal scanning period. The operation of the present embodiment excepting the above-mentioned operation is similar to the operation of the embodiment of FIG. 31. The present embodiment has merits that since the horizontal scanning frequency of a horizontal scanning circuit or X driver circuit XDC is a half of that in the embodiment of FIG. 20, the driving of the imaging device is easy as compared with the embodiment of FIG. 20, that since two output signals to be subtracted from each other are obtained from separate output terminals at the same timing, like the embodiment of FIG. 31, a differential signal can be readily obtained without delayed processing of the output signals, and that since pixel signal outputs of two rows are simultaneously obtained, field reading is possible.

EMBODIMENT 15

A fifteenth embodiment of the present invention will be explained by virtue of FIG. 32B.

Figure 32B:
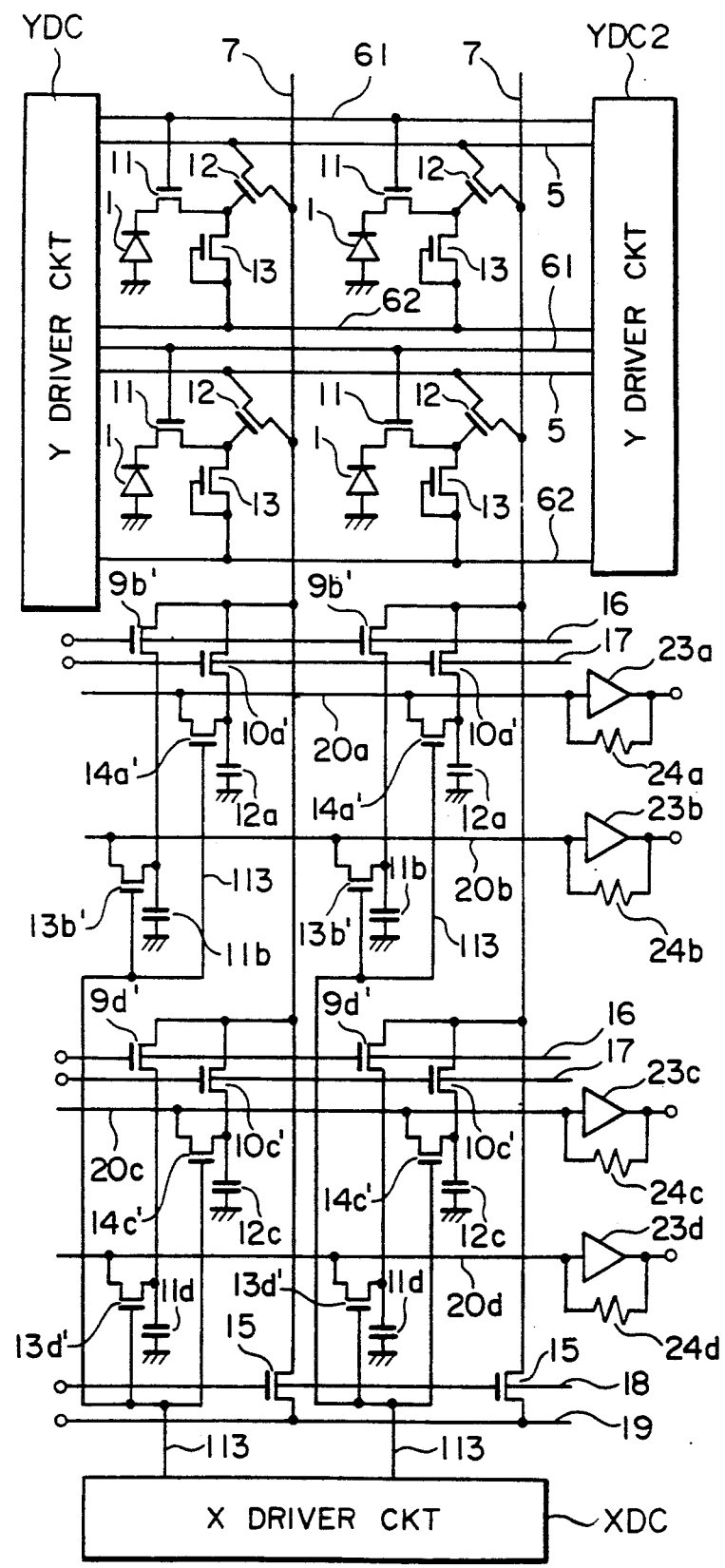

FIG. 32B is a circuit diagram showing the construction of the fifteenth embodiment. The present embodiment corresponds to the combination of the foregoing embodiments, that is, the combination of the embodiment shown in FIG. 32A, the embodiment represented by FIG. 2 and the embodiment represented by FIG. 8. According to the present embodiment, power supply line driving circuits or Y driver circuits YDC and YDC2 are provided at opposite ends of a power supply line 5 and the resistance of the power supply line 5 is made low. Further, since the construction of the fourteenth embodiment shown in FIG. 32A is included, the present embodiment has the effects obtained by the fourteenth embodiment. The operation of the present embodiment is the same as the operation of the fourteenth embodiment except that the power supply line driving circuits YDC and YDC2 drive the power supply line 5 at the same timing.

The foregoing embodiments have been explained for convenience of illustration in conjunction with the solid-state imaging device having pixels the number of which is 2×2. However, it is obvious that the present invention may be applied to a solid-state imaging device having pixels the number of which is m (any integer inclusive of 1)×n (any integer inclusive of 1). The present invention has real worth in a large-scale solid-state imaging device having pixels the number of which is, for example, 1000×2000.

EMBODIMENT 16

Solid-state imaging devices according to the present invention can be applied to a variety of information or data processing systems. A sixteenth embodiment of the present invention applied to a data processor will now be explained.

Figure 33:
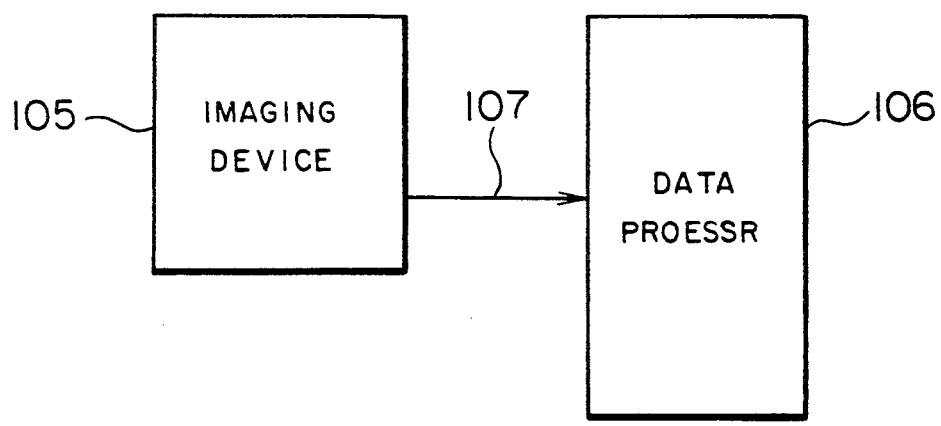

FIG. 33 is a block diagram showing an example of a data processing system according to the sixteenth embodiment of the present invention. In FIG. 33, an output line 107 extending from a solid-state imaging device 105 is connected to a data processor 106. The solid-state imaging device 105 may be, for example, the device according to the embodiment shown in FIG. 20. The data processor 106 may be a data processor which has a video camera, an electronic steal camera or the other information or data output means.

Figure 34:
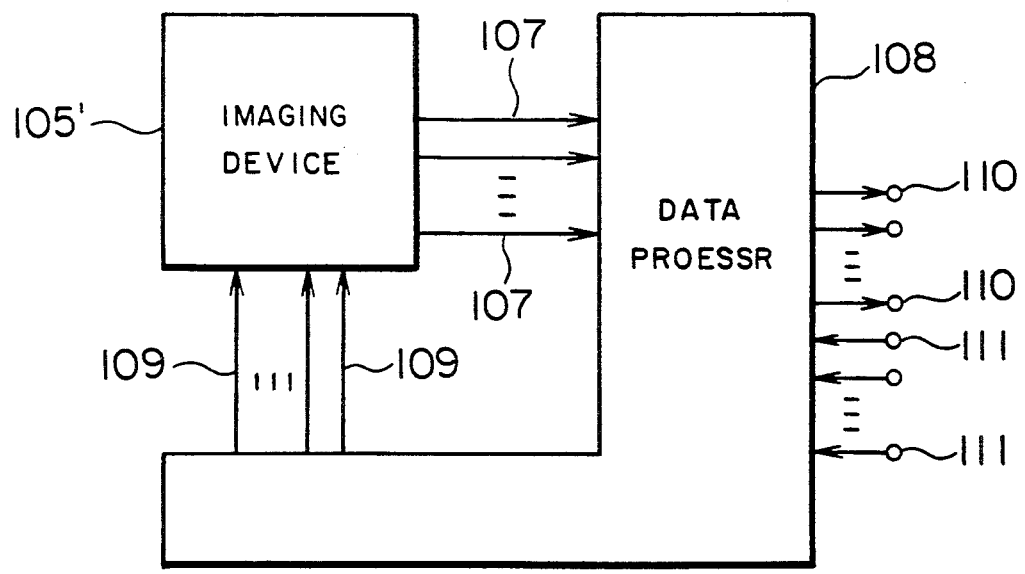

FIG. 34 is a block diagram showing another example of the data processing system according to the sixteenth embodiment of the present invention. Between a solid-state imaging device 105' and a data processor 108 are provided input lines 109 to the solid-state imaging device 105' and output lines 107 from the solid-state imaging device 105'. The data processor 108 has outputs 110 to the exterior and inputs 111 from the exterior. The solid-state imaging device 105' may be, for example, the device according to the embodiment shown in FIG. 20. The data processor 108 may be a video camera body connected to a communication network or a data processor forming a part of a communication network.

According to the ninth to sixteenth embodiments, there can be provided a solid-state imaging device in which the deterioration of an output signal is unlikely to take place even with the increased output frequency, thereby making it possible to cope with ultra-high resolution imaging.

As has been mentioned above, the present invention can solve problems inherent to a large-scale solid-state imaging device having pixels the number of which is, for example, not less than 1000×2000. Namely, the present invention can prevent a voltage drop due to the extended length of a power supply line and the increase in number of loads elements. Thereby, the increase of noises and the lowering of sensitivity due to the voltage drop can be prevented. Also, a problem in a read-out operation caused from the increase in the number of pixels can be solved.

It is understood by those skilled in the art that the foregoing description concerns preferred embodiments of the present invention and that various changes and modifications may be made in the invention without departing from the spirit and scope thereof.

We claim:

1. A solid-state imaging device comprising a plurality of photoelectric conversion elements, a plurality of signal amplifying means for receiving and amplifying respective electric signals produced by optical signals incident upon said photoelectric conversion elements, a plurality of power supply lines each of which supplies electric power to at least one of said plurality of signal amplifying means, a plurality of power supply line driving means each of which drives all of said power supply lines by providing electric power to said power supply lines, and transfer means for reading out the outputs of said signal amplifying means, wherein said plurality of power supply line driving means supply substantially the same electric power with substantially the same clock timing to each of said power supply lines.

2. A solid-state imaging device according to claim 1, wherein at least one signal amplifying means is connected to one of the power supply lines which is connected between at least two of said plurality of power supply line driving means.

3. A solid-state imaging device according to claim 1, wherein two of said plurality of power supply line driving means are provided at opposite ends of each of said power supply lines.

4. A solid-state imaging device according to claim 1, wherein each of said photoelectric conversion elements includes a photodiode and said photoelectric conversion elements are arranged to provide a matrix having pixels the number of which is not less than 1000×2000.

5. A solid-state imaging device according to claim 1, wherein each of said plurality of signal amplifying means includes an MOS transistor.

6. A solid-state imaging device comprising a plurality of photoelectric conversion elements, a plurality of signal amplifying means for receiving and amplifying respective electric signals produced by optical signals incident upon said photoelectric conversion elements, a plurality of power supply lines each of which supplies electric power to at least one of said plurality of signal amplifying means, a plurality of power supply line driving means each of which drives all of said power supply lines by providing electric power to said power supply lines, and transfer means for reading out the outputs of said signal amplifying means, wherein said plurality of power supply line driving means supply substantially the same electric power with substantially the same clock timing to each of said power supply lines, wherein a signal line for commonly outputting currents of said signal amplifying means is coupled to at least predetermined ones of said signal amplifying means, and wherein a resistance per unit length of said power supply lines is lower than that of said signal line.

7. A solid-state imaging device according to claim 6, wherein a plurality of the signal amplifying means are formed in a matrix of M rows and N columns, and having N power supply lines and M second lines for commonly outputting currents of N of said signal amplifying means.

8. A solid-state imaging device comprising a plurality of photoelectric conversion elements, a plurality of signal amplifying means for receiving and amplifying respective electric signals produced by optical signals incident upon said photoelectric conversion elements, a plurality of power supply lines each of which supplies electric power to at least one of said plurality of signal amplifying means, a plurality of power supply line driving means each of which drives all of said power supply lines by providing electric power to said power supply lines, and transfer means for reading out the outputs of said signal amplifying means, wherein said plurality of power supply line driving means supply substantially the same electric power with substantially the same clock timing to each of said power supply lines, further comprising first switch means, second switch means, a plurality of storing means for storing the outputs of said signal amplifying means through said first switch means, and scanning means for scanning outputs of said storing means through said second switch means, wherein a resistance of said second switch means upon turn-on thereof is lower than a resistance of said first switch means upon turn-on thereof.

9. A solid-state imaging device according to claim 8, wherein each of said first and second switch means includes a field effect transistor.

10. A solid-state imaging device according to claim 8, wherein at least one signal amplifying means is connected to one of the power supply lines which is connected between at least two of said plurality of power supply line driving means.

11. A solid-state imaging device according to claim 8, wherein two of said power supply line driving means are provided at opposite ends of each of said power supply lines.

12. A solid-state imaging device according to claim 8, wherein each of said photoelectric conversion elements includes a photodiode and said photoelectric conversion elements are arranged to provide a matrix having pixels the number of which is not less than 1000×2000.

13. A solid-state imaging device according to claim 8, wherein each of said plurality of signal amplifying means includes an MOS transistor.

14. A solid-state imaging device comprising:
a plurality of photoelectric conversion elements arranged as an array,
a plurality of signal amplifying means for receiving and amplifying respective electric signals produced by the photoelectric conversion elements,
a plurality of power supply lines, each of the signal amplifying means being electrically coupled to a corresponding one of the power supply lines,
a first power supply line driving means for driving said powers supply lines, being electrically coupled to the power supply lines,
a second power supply line driving means for driving said power supply lines, being electrically coupled to the power supply lines,
wherein the first power supply line driving means is provided on one end of the power supply lines, and the second power supply line driving means is provided on the other end of the power supply lines, and
wherein the first and second power supply line driving means sequentially drive each of the power supply lines substantially simultaneously.

15. A solid-state imaging device according to claim 14, wherein each of said photoelectric conversion elements includes a photodiode and said photoelectric conversion elements are arranged to provide a matrix having pixels the number of which is not less than 1000×2000.

16. A solid-state imaging device according to claim 14, wherein each of said plurality of signal amplifying means includes an MOS transistor.

* * * * *